(12) United States Patent
Wu et al.

(10) Patent No.: US 10,074,072 B2
(45) Date of Patent: Sep. 11, 2018

(54) TAGGED ITEM LOCATOR METHOD AND APPARATUS

(71) Applicants: Michael Wu, San Jose, CA (US); Addicam V. Sanjay, Gilbert, AZ (US); Daniel Gutwein, Chandler, AZ (US)

(72) Inventors: Michael Wu, San Jose, CA (US); Addicam V. Sanjay, Gilbert, AZ (US); Daniel Gutwein, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 88 days.

(21) Appl. No.: 15/200,577

(22) Filed: Jul. 1, 2016

(65) Prior Publication Data
US 2018/0005172 A1    Jan. 4, 2018

(51) Int. Cl.
*G08B 13/14* (2006.01)
*G06Q 10/08* (2012.01)
*G06F 17/30* (2006.01)
*G01S 5/02* (2010.01)

(52) U.S. Cl.
CPC .......... *G06Q 10/087* (2013.01); *G01S 5/0252* (2013.01); *G01S 5/0294* (2013.01); *G06F 17/30557* (2013.01)

(58) Field of Classification Search
CPC .......... G06F 17/2785; G06F 17/30976; G06F 17/277; G06F 17/30867; G06F 17/278; G06F 17/30958; G06F 17/30557; G06Q 50/01; G06Q 10/087; G10L 15/22; G10L 2015/223; G01S 5/0252; G01S 5/0294

USPC ............... 340/572.4, 10.1, 326, 505, 539.21, 340/539.32, 691.5, 825.49, 691.3–691.6
See application file for complete search history.

(56) References Cited

U.S. PATENT DOCUMENTS

| | | | |
|---|---|---|---|
| 6,714,121 B1 | 3/2004 | Moore | |
| 7,142,120 B2* | 11/2006 | Charych | G01S 3/20 235/385 |
| 9,111,251 B1* | 8/2015 | Brazeau | G06Q 10/087 |
| 2005/0197929 A1* | 9/2005 | Lucas | G06Q 10/06 705/28 |

(Continued)

OTHER PUBLICATIONS

International Search Report and Written Opinion dated Aug. 18, 2017 for International Application No. PCT/US2017/035274, 11 pages.

*Primary Examiner* — Daniel Previl
(74) *Attorney, Agent, or Firm* — Schwabe, Williamson & Wyatt, P.C.

(57) ABSTRACT

Apparatus and method to facilitate determination of item locations are disclosed herein. One or more storage medium to store a plurality of initial tag to item holder mappings that define associations between select ones of a plurality of tags associated with items to select ones of a plurality of item holders that hold the items; one or more processors; and read rate and match modules to be executed by the one or more processors may be provided. The read rate module is to generate a current detection rate by one or more antennas for each tag identified in a plurality of filtered current tag to antenna mappings. The match module is to determine at least one item holder at which each respective tag identified in the plurality of filtered current tag to antenna mappings is most likely to be currently located to provide a location of the item.

24 Claims, 7 Drawing Sheets

(56) References Cited

U.S. PATENT DOCUMENTS

| | | | |
|---|---|---|---|
| 2010/0117832 A1* | 5/2010 | Koo | G06Q 10/08 340/572.1 |
| 2011/0195699 A1* | 8/2011 | Tadayon | H04B 5/0062 455/418 |
| 2012/0105210 A1 | 5/2012 | Smith et al. | |
| 2015/0169923 A1* | 6/2015 | Chang | G01S 3/046 340/10.1 |

* cited by examiner

Non-transitory computer-readable storage medium
702

Programming Instructions 704
configured to cause a computer device, in response to execution of the programming instructions, to practice one or more operations of the methods described in reference to Figures 1-5.

FIG. 7

TAGGED ITEM LOCATOR METHOD AND APPARATUS

FIELD OF THE INVENTION

The present disclosure relates generally to the technical field of computing, and more particularly, to computing systems for locating stationary and/or moving tagged items.

BACKGROUND

The background description provided herein is for the purpose of generally presenting the context of the disclosure. Unless otherwise indicated herein, the materials described in this section are not prior art to the claims in this application and are not admitted to be prior art or suggestions of the prior art, by inclusion in this section.

While objects or items may be tracked during shipment or upon arrival at a destination, such items may not continue to be tracked thereafter. For example, the items may comprise items available for sale in a store. When the items arrive at the store, they may be inventoried while in the backroom. Once the items are placed in the front of the store, however, their subsequent locations may not be tracked. When a customer then desires a particular item (e.g., a particular jacket in a particular color and size), if the customer and/or store employee is unable to find the particular item within the store, a sale of that particular item may be lost due to the inability to find the item. In fact, the item may still be in the store but in a different location than when it was stocked from the backroom or where it was searched. The item may have been moved to a different location by another customer or an employee. Thus, having access to item location information within a space may be beneficial for, among other things, increased sales, better inventory control, and the like. Location information may also benefit by being useful or contextual in the particular space in which the item is located so that personnel may readily find items within the particular space.

BRIEF DESCRIPTION OF THE DRAWINGS

Embodiments will be readily understood by the following detailed description in conjunction with the accompanying drawings. The concepts described herein are illustrated by way of example and not by way of limitation in the accompanying figures. For simplicity and clarity of illustration, elements illustrated in the figures are not necessarily drawn to scale. Where considered appropriate, like reference labels designate corresponding or analogous elements.

FIG. 7 illustrates an example non-transitory computer-readable storage media having instructions configured to practice all or selected ones of the operations associated with the processes described herein, according to some embodiments.

DETAILED DESCRIPTION

Figure 1:
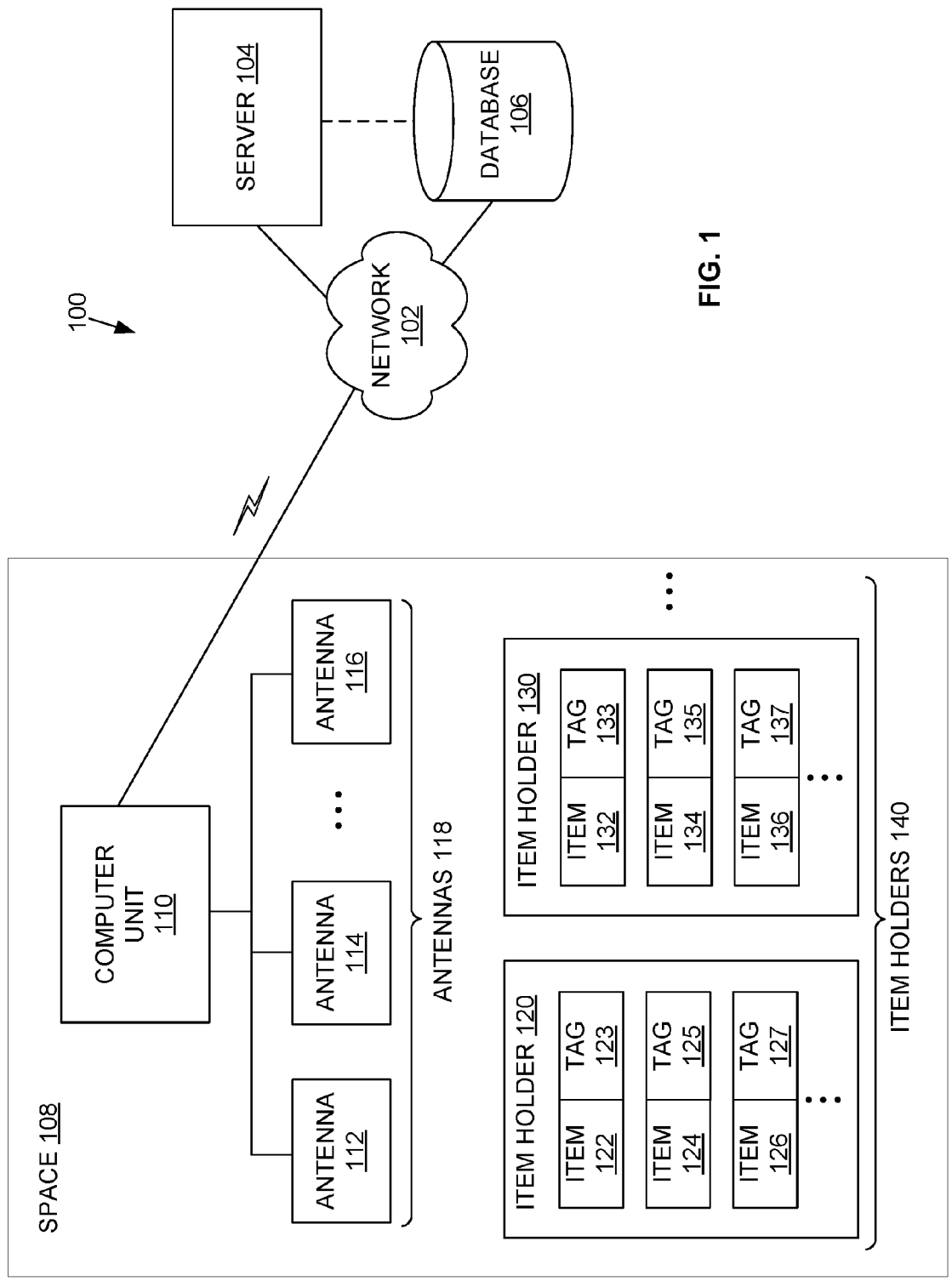
FIG. 1 depicts a block diagram illustrating a network view of an example system for practicing the present disclosure, according to some embodiments.

Embodiments of apparatuses and methods related to automatically locating stationary and/or moving tagged items are described. In some embodiments, an apparatus may include one or more storage medium to store a plurality of initial tag to item holder mappings that define associations between select ones of a plurality of tags associated with items to select ones of a plurality of item holders that hold the items, wherein select ones of the plurality of tags are to be detected by select ones of a plurality of antennas when in proximity to each other; and one or more processors. The apparatus may also include read rate and match modules to be executed by the one or more processors, the read rate module is to generate a current detection rate by one or more antennas, wherein to generate, the read module is to generate, for each tag identified in a plurality of filtered current tag to antenna mappings, a current detection rate by one or more antennas, of the plurality of antennas, over a pre-set time duration, and the match module is to determine at least one item holder, from among the plurality of item holders, at which each respective tag identified in the plurality of filtered current tag to antenna mappings is most likely to be currently located to provide a location of the item, wherein to determine the at least one item holder for each tag, the match module is to use the current detection rate for each respective tag and a plurality of initial detection rates associated with a plurality of initial item holder to antenna mappings. These and other aspects of the present disclosure will be more fully described below.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Additionally, it should be appreciated that items included in a list in the form of "at least one A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device). As used herein, the term "logic" and "module" may refer to, be part of, or include an application specific integrated circuit (ASIC), an electronic circuit, a processor (shared, dedicated, or group), and/or memory (shared, dedicated, or group) that execute one or more software or firmware programs having machine instructions (generated from an assembler and/or a compiler), a combinational logic circuit, and/or other suitable components that provide the described functionality.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, it may not be included or may be combined with other features.

FIG. 1 depicts a block diagram illustrating a network view of an example system 100 for practicing the present disclosure, according to some embodiments. System 100 may include a network 102; a server 104; a database 106; a computer unit 110; a plurality of antennas 118; a plurality of item holders 140 that hold items 122, 124, 126, 132, 134, 136 with associated tags 123, 125, 127, 133, 135, 137. Each of the server 104, database 106, and computer unit 110 may communicate with the network 102.

Network 102 may comprise one or more wired and/or wireless communications networks. Network 102 may include one or more network elements (not shown) to physically and/or logically connect computer devices to exchange data with each other. In some embodiments, network 102 may be the Internet, a wide area network (WAN), a personal area network (PAN), a local area network (LAN), a campus area network (CAN), a metropolitan area network (MAN), a virtual local area network (VLAN), a cellular network, a WiFi network, a WiMax network, and/or the like. Additionally, in some embodiments, network 102 may be a private, public, and/or secure network, which may be used by a single entity (e.g., a business, school, government agency, household, person, and the like). Although not shown, network 102 may include, without limitation, servers, databases, switches, routers, gateways, base stations, repeaters, software, firmware, intermediating servers, and/or other components to facilitate communication.

Server 104 may comprise one or more computers, processors, or servers to perform the data processing and matching techniques described herein. In some embodiments, server 104 may communicate with database 106 (directly or indirectly via network 102) and/or computer unit 110, via network 102. Server 104 may host one or more applications accessed by computer unit 110 and/or execute one or more computer readable instructions to determine the locations of items within the space 108. In some embodiments, server 104 may include one or more of a data aggregate module 206, filter module 208, read rate module 210, match module 212, dominant antenna breakdown module 402, and/or tag movement module 404. Server 104 may provide processing functionalities for computer unit 110; provide data to and/or receive data from computer unit 110; determine read-rates associated with various data sets; perform filtering of data sets; determine particular item holders on which particular items may be located; determine dominant antenna breakdowns for various data sets; identify which items may have moved to which item holders; and the like, to be described in greater detail below. In some embodiments, server 104 may include one or more web servers, one or more application servers, one or more servers providing user interface (UI) or graphical user interface (GUI) functionalities, and the like.

Database 106 may comprise one or more storage devices to store data and/or instructions for use by computer unit 110 and/or server 104. The content of database 106 may be accessed via network 102 and/or directly by the server 104. The content of database 106 may be arranged in a structured format to facilitate selective retrieval. In some embodiments, the content of database 106 may include, without limitation, baseline or layout data to be used for comparison against collected data to be analyzed (e.g., tag-item holder pairs), one or more pre-set values used for data analysis or processing (e.g., thresholds), processed data that may be used in subsequent computations, previous tag location results, and the like. In some embodiments, database 106 may comprise more than one database. In some embodiments, database 106 may be included within server 104.

Space 108 may comprise a physical space within which the plurality of antennas 118 may be distributed to detect the presence of any one or more of a plurality of tags (e.g., tags 123, 125, 127, 133, 135, 137) in the space 108. In some embodiments, space 108 may comprise any defined physical space; a store; a warehouse; an office; a business; a building; a house; a school; a room; a vehicle; a transport; a part of any of a store, warehouse, office, business, building, house, school, room, vehicle, or transport; and the like. Computer unit 110; plurality of antennas 118; plurality of item holders 140; a plurality of items (e.g., items 122, 124, 126, 132, 134, 136); and a plurality of tags (e.g., tags 123, 125, 127, 133, 135, 137) may be located within the space 108.

Computer unit 110 may comprise one or more wired and/or wireless communication computing devices in communication with server 104 via network 102. Computer unit 110 may comprise, without limitation, one or more work stations, personal computers, general purpose computers, laptops, Internet appliances, hand-held devices, wireless devices, Internet of Things (IoT) devices, wearable devices, set top boxes, appliances, vehicles, wired devices, portable or mobile devices, cellular or mobile phones, portable digital assistants (PDAs), smart phones, tablets, multi-processor systems, microprocessor-based or programmable consumer electronics, game consoles, set-top boxes, network PCs, mini-computers, and the like.

Computer unit 110 may include applications, software, and/or other executable instructions to facilitate various aspects of the techniques described herein. For example, computer unit 110 may provide data to and/or receive data from server 104; determine read-rates associated with various data sets; perform filtering of data sets; determine particular item holders on which particular items may be located; determine dominant antenna breakdowns for various data sets; identify which items may have moved to which item holders; and the like, to be described in greater detail below. In some embodiments, computer unit 110 may include one or more of the data aggregate module 206, filter module 208, read rate module 210, match module 212, dominant antenna breakdown module 402, and/or tag movement module 404. Computer unit 110 may also include additional applications or other interface capabilities to communicate with the server 104 and/or database 106. Computer unit 110 may be geographically dispersed from server 104 and/or database 106.

In some embodiments, computer unit 110 may provide data obtained from the plurality of antennas 118 (e.g., tag detection data) to server 104, and server 104 may analyze the received data in order to identify item holders at which items are likely currently located. Then such results may be (selectively) provided to computer unit 110 either automatically or in response to inquiries made by personnel interfacing with computer unit 110. In alternative embodiments, computer unit 110 may analyze the data from the plurality of antennas 118 and identify item holders currently associated with respective items without the server 104 because, for example, computer unit 110 possesses sufficient processing capacity. In still other embodiments, computer unit 110 and server 104 may share processing and/or data storage duties depending upon, for example, processing capabilities, time requirements, network availability, redundancy protocol, and the like.

Computer unit 110 may be configured for wired and/or wireless communication with the plurality of antennas 118 within the space 108. The plurality of antennas 118 may comprise two, three, four, ten, fifty, hundred, or more antennas, such as antennas 112, 114, 116. The plurality of antennas 118 may be specifically distributed or deployed within the space 108 so as to facilitate accurate determination of which item may be disposed on which item holder. Each of the antennas included the plurality of antennas 118 may be configured to detect the presence of any tag of the plurality of tags within its detection range on a periodic basis. The plurality of antennas 118 may comprise radio frequency identification (RFID) antennas, Bluetooth antennas or detectors, wireless antennas, tag proximity sensors, proximity detectors, and the like. In some embodiments, the plurality of antennas 118 may comprise a plurality of RFID antennas having a detection range of up to approximately 7 to 10 meters and each of the RFID antennas may be capable of reading/detecting approximately 100 to upwards of 400 tags per second. In some instances, the reading/detection capabilities of one or more of the RFID antennas may be slowed down to address factors such as, but not limited to, RF congestion within the deployment area. For instance, even though an RFID antenna may be capable of reading/detecting up to around 400 tags per second, it may to throttled down to read/detect up to 100 tags per second. Also, if there are, for example, 1,000 tags in an area, any given tag within comfortable proximity to at least one antenna may not be read any more than once every approximately 10 seconds. Many tags may only be read once per day and some tags may only be read once every couple of days.

The plurality of items, such as items 122, 124, 126, 132, 134, 136, may comprise any type of item including, without limitation, inventory objects, items available for purchase in the space 108, items desirous of tracking within the space 108, apparel, shoes, accessories, sporting equipment, electronics, furniture, furnishings, and the like. One or more of the plurality of items may be identical to each other (e.g., same brand, model, color, size, stock keeping unit (SKU)), different from each other (e.g., item 122 may be an article of clothing, while item 132 may be a soccer ball), or different versions of each other (e.g., item 122 may be a particular style of jacket by a particular manufacturer in color blue and size 10, while item 124 may be the same style of jacket by the same manufacturer in color blue but in size 12). The plurality of items may comprise hundreds, thousands, hundreds of thousands, or more items, depending upon the size of space 108. In some embodiments, the plurality of items may comprise items that may be moved by personnel within the space 108 over time.

In some embodiments, each item of the plurality of items may be attached to a respective one of the plurality of tags, such as tags 123, 125, 127, 133, 135, 137. For example, FIG. 1 shows items 122, 124, 126, 132, 134, 136 associated with respective tags 123, 125, 127, 133, 135, 137. Each of the plurality of tags may be associated with a unique tag identifier. Accordingly, each item of the plurality of items may be uniquely identifiable via its associated tag. And by determining the location of a particular tag, the location of the associated item may also be known. Because the plurality of items and the respective ones of the plurality of tags may be attached or coupled to each other, terms such as plurality of items, plurality of tags, items, tags, or the like may be used interchangeably within the present disclosure. In some embodiments, the plurality of tags may comprise, without limitation, RFID tags or tags that may be compatible with the plurality of antennas 118.

In some embodiments, the plurality of items may be held, disposed, placed, reside, or otherwise associated with the plurality of item holders 140. Each of the plurality of item holders 140 may comprise an object capable of holding one or more items. The plurality of item holders 140 may comprise, without limitation, shelves, racks, tables, drawers, bins, pallets, display cases, boxes, or the like. FIG. 1 shows items 122, 124, 126 associated with item holder 120 and items 132, 134, 136 associated with item holder 130.

Each of the plurality of items, plurality of tags, plurality of antennas 118, and plurality of item holders 140 may be associated with a unique identifier and thus uniquely identifiable.

For instance, space 108 may comprise an apparel store; the plurality of items may comprise clothing, shoes, accessories, and any other objects available for purchase in the store; the plurality of item holders 140 may comprise shelves, racks, and tables that hold and/or display the items; and the plurality of antennas 118 and tags may comprise RFID antennas and tags. Over time, one or more items may be moved from one shelf to another or from a shelf to a rack by customer(s) and/or store employee(s). In order to find a particular item at a particular point in time, it may be beneficial to be able to automatically, in real-time or near real-time, and continuously determine the particular shelf, rack, or table at which the particular item is currently likely to be found.

Although a single space 108 is shown in FIG. 1, more than one space such as space 108 may be implemented in the system 100. As described above, item holders likely to hold particular items may be determined for each of the respective spaces.

Figure 2:
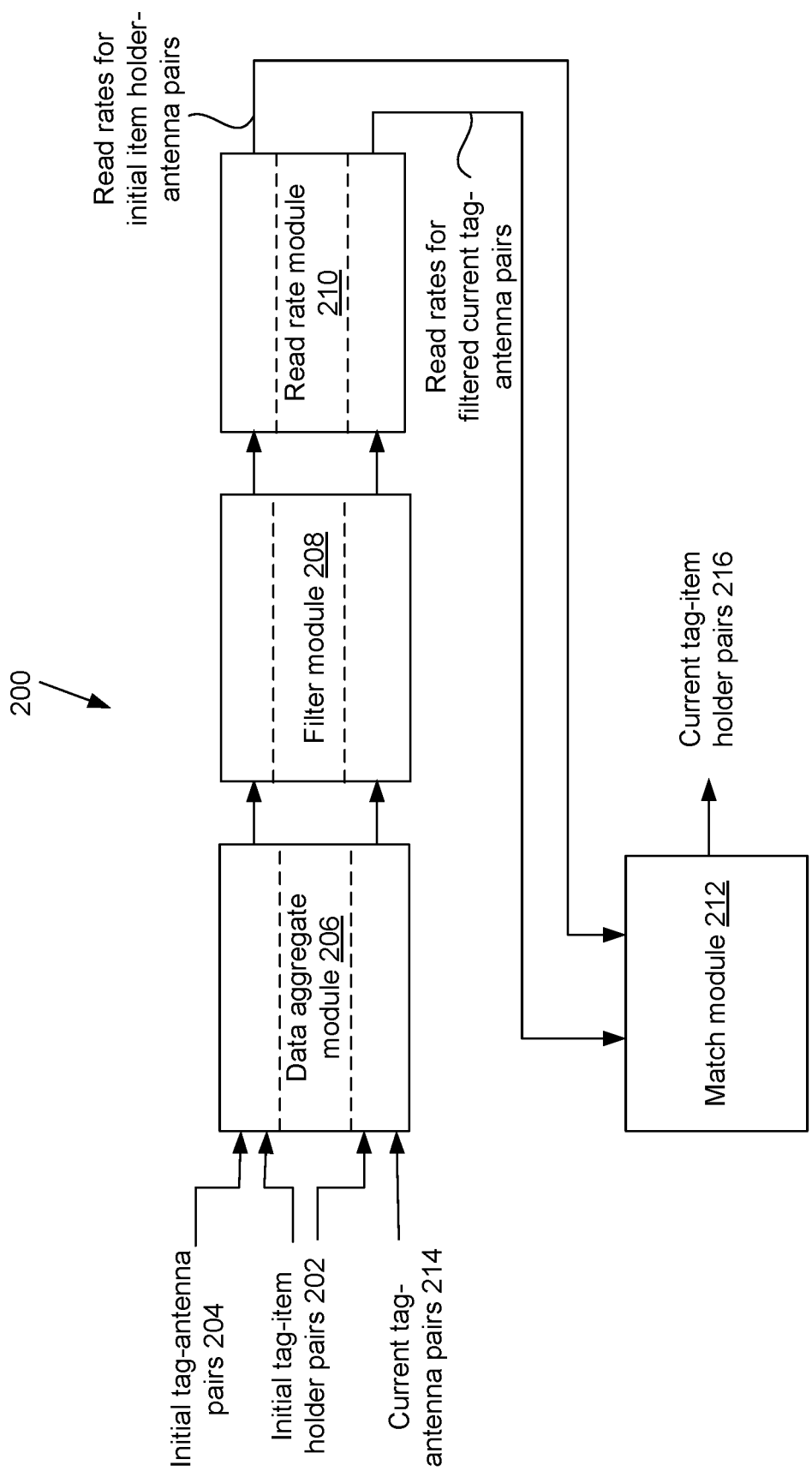
FIG. 2 depicts an example block diagram illustrating a logical view of the system of FIG. 1, the block diagram illustrating algorithmic structures included in the system of FIG. 1 and data associated with the processes performed by the algorithmic structures, according to some embodiments.

FIG. 2 depicts an example block diagram 200 illustrating a logical view of the system 100, block diagram 200 illustrating algorithmic structures included in system 100 and data associated with the processes performed by the algorithmic structures, according to some embodiments. FIG. 2 illustrates example components and data that may be included in system 100 to determine locations of tags, according to some embodiments. The various components and/or data shown in FIG. 2 may be implemented at least partially by hardware at one or more computing devices, such as one or more hardware processors executing instructions stored in one or more memories for performing various functions described herein. The components and/or data may be communicatively coupled (e.g., via appropriate interfaces) to each other and to various data sources, so as to allow information to be passed between the components and/or to share and access common data. FIG. 2 illustrates only one of many possible arrangements of components and data configured to perform the functionalities described herein. Other arrangements may include fewer or different components and/or data, and the division of work between the components and/or data may vary depending on the arrangement. In some embodiments, modules 206-212 may comprise one or more software components, programs, applications, or other units of code base or instructions configured to be executed by one or more processors included in the server 102 and/or computer unit 110. Although modules 206-212 may be depicted as distinct components in FIG. 2, modules 206-212 may be implemented as fewer or more components than illustrated.

In some embodiments, locations of stationary items may be determined based on three data sets: initial tag-item holder pairs 202, initial tag-antenna pairs 204, and current tag-antenna pairs 214. Initial tag-item holder pairs 202 and initial tag-antenna pairs 204 may comprise data sets obtained during a first or initial time period that is prior to a second or current time period during which the current tag-antenna pairs 214 may be acquired. Initial tag-item holder pairs 202 and initial tag-antenna pairs 204 may collectively be referred to as an initial data set or baseline data set for a particular layout of item holders 140 within the space 108. The initial data set may be associated with the plurality of items initially placed on the plurality of item holders 140 by, for example, store employees and prior to access by customers or the like. When the layout of item holders 140 and/or items within space 108 changes (e.g., store layout may be reconfigured, store may be remodeled, items may be restocked, etc.), a new initial data set may be acquired. Accordingly, the initial data set may also be referred to as ground truth data. Current tag-antenna pairs 214 may be continuously or periodically acquired after acquisition of the initial data set, and thus may comprise a plurality of current data sets. Current data sets may be associated with, for example, items moving around over time within space 108 by customers. For purposes of ease of describing aspects of the disclosure, determination of tag locations based on a single set of the current tag-antenna pairs 214 may be described herein.

Each of the initial tag-item holder pairs 202 may comprise a pair or mapping defining a relationship or association between a particular tag (e.g., tag 123, 125, 127, 133, 135, or 137) and a particular item holder (e.g., item holder 120 or 130) at the initial time period. Initial tag-item holder pairs 202 may also be referred to as initial tag to item holder mappings or initial tag to item holder pairs. Each of the initial tag-antenna pairs 204 may comprise a pair or mapping defining a relationship or association between a particular tag (e.g., tag 123, 125, 127, 133, 135, or 137) and a particular antenna (e.g., antenna 112, 114, or 116) at the initial time period. Initial tag-antenna pairs 204 may also be referred to as initial tag to antenna mappings or initial tag to antenna pairs. Each of the current tag-antenna pairs 214 may comprise a pair or mapping defining a relationship or association between a particular tag (e.g., tag 123, 125, 127, 133, 135, or 137) and a particular antenna (e.g., antenna 112, 114, or 116) at the current time period. Current tag-antenna pairs 214 may also be referred to as current tag to antenna mappings or current tag to antenna pairs.

In some embodiments, the initial tag-item holder pairs 202 and initial tag-antenna pairs 204 may comprise inputs to the data aggregate module 206. Data aggregate module 206 may be configured to obtain, receive, or access the initial tag-item holder pairs 202 and initial tag-antenna pairs 204 from one or more acquisition sources. Data aggregate module 202 may also be configured to aggregate data from the various acquisition sources either for local processing in computer unit 110 and/or to transmit to server 104. For example, the initial tag-item holder pairs 202 may be acquired by visual inspection and/or scanning of tags disposed on item holders 140 in space 108 during the initial time period. In some embodiments, a subset of the tags located within the space 108 may be visually inspected and/or scanned to generate the initial tag-item holder pairs 202. Initial tag-antenna pairs 204 may be generated by the plurality of antennas 118 based on detection of particular tag(s) by particular antenna(s) during the initial time period. In some embodiments, the initial time period may comprise 30 minutes or approximately 30 minutes. Such antenna detection information may be provided to the computer unit 110.

Filter module 208 may be configured to perform one or more filtering operations on the initial tag-antenna pairs 204 using at least the initial tag-item holder pairs 202. Filtered initial tag-antenna pairs may thus be generated for use by the read rate module 210. The filtering operations may remove data they may be irrelevant or indeterminate, and thus not helpful in use for determination of the current tag locations. Details pertaining to filtering operations may be described in detail below.

In some embodiments, the read rate module 210 may be configured to generate a plurality of read rates or detection rates associated with initial item holder-antenna pairs, which may be generated from the filtered initial tag-antenna pairs and the initial tag-item holder pairs 202. A read or detection rate for specified or pre-set time duration may be calculated for each initial item holder-antenna pair. The read or detection rate may be based on a count of total tag reads or detections and a count of unique tag reads or detections during the specified time duration by the antenna of the given initial item holder-antenna pair, as discussed in greater detail below. The read or detection rates associated with the initial item holder-antenna pairs may comprise the initial data input to the match module 212.

In some embodiments, the data aggregate module 206 and filter module 208 may perform similar functions as discussed above except using the current tag-antenna pairs 214 and the initial tag-item holder pairs 202 as inputs to the data aggregate module 206. Instead of performing operations on the initial tag-antenna pairs 204 as described above, such operations may be performed on the current tag-antenna pairs 214. Filtered current tag-antenna pairs may be provided to the read rate module 210 from the filter module 208.

The read rate module 210 may be configured to generate a plurality of read rates or detection rates associated with the filtered current tag-antenna pairs. A read or detection rate for specified or pre-set time duration may be calculated for each tag of the filtered current tag-antenna pairs. The read or detection rate may be based on a count of total tag reads or detections during the specified time duration by the antenna of the given filtered current tag-antenna pair, as discussed in greater detail below. The read or detection rates associated with the filtered current tag-antenna pairs may comprise the current data input to the match module 212.

The match module 212 may be configured to determine one or more particular item holders on which a particular item/tag may be most likely to be located at the current time. Such determination may be performed for a plurality of the items within space 108. Thus, current tag-item holder pairs 216 may be generated to identify the item holder locations of particular items. In some embodiments, a match between a particular tag and one or more particular item holders may be found based on comparisons and/or characteristics of particular read or detection rates of initial item holder-antenna pairs to the particular tag's read or detection rates associated with the filtered current tag-antenna pairs. One or more matching techniques may be performed by the match module 212 for a particular tag. In some embodiments, the match module 212 may use a "majority rules" logic to select the particular item holder from among a plurality of candidate matching item holder(s) identified by the plurality of matching techniques to be deemed the final particular item holder to be associated with the particular tag. Additional details pertaining to matching techniques may be described below in conjunction with at least FIG. 3.

In some embodiments, various data such as, but not limited to, the initial tag-item holder pairs 202, initial tag-antenna pairs 204, current tag-antenna pairs 214, read or detection rates, current tag-item holder pairs 216, and the like may be stored in database 106 and/or computer unit 110. Such data may be organized in particular data structures, data tables, data spreadsheets, relational data scheme, and the like suitable for archival, selective retrieval, and the like.

Figure 3:
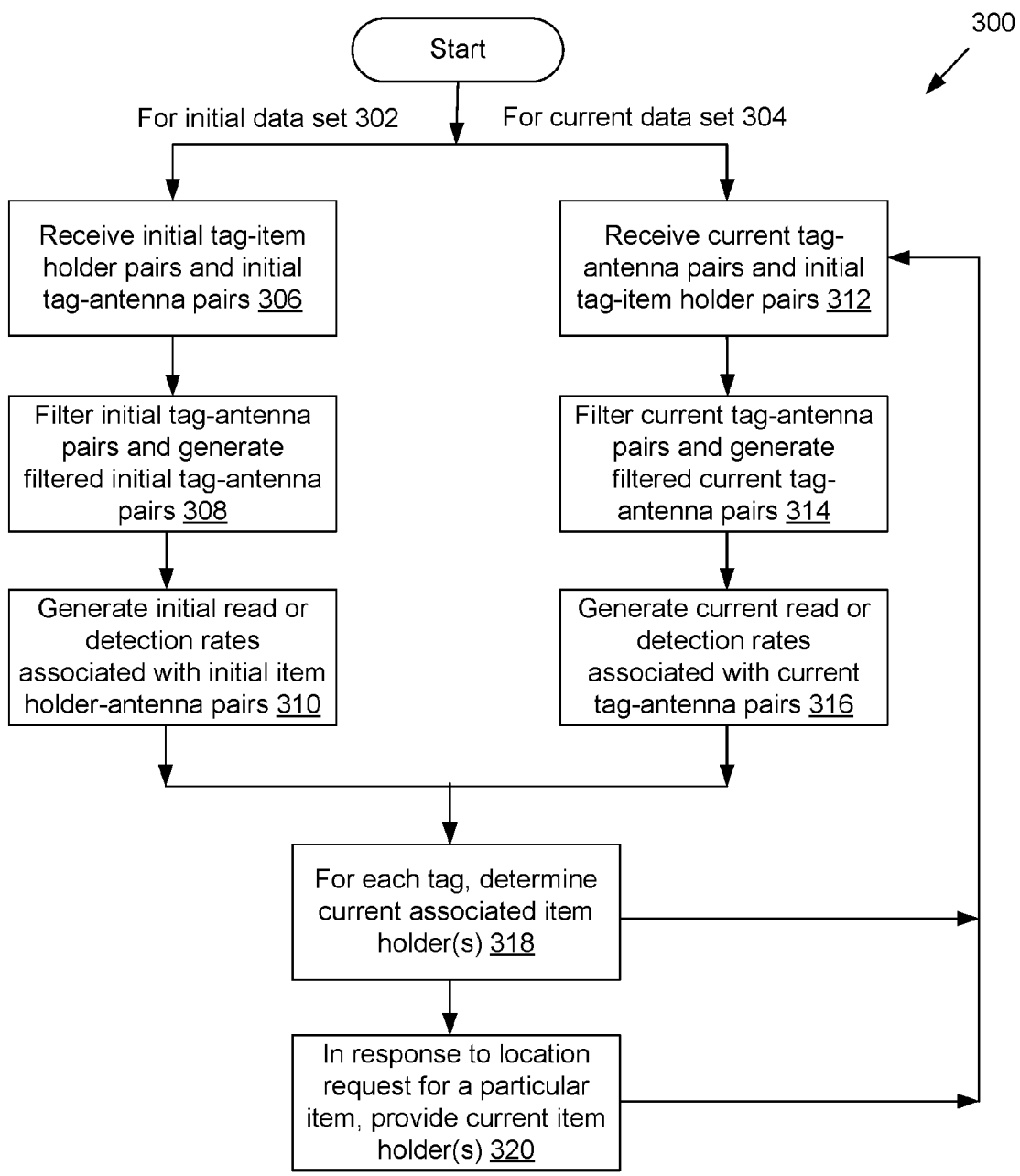
FIG. 3 depicts an example process to automatically determine locations of stationary tags in real-time or near real-time, according to some embodiments.

FIG. 3 depicts an example process 300 to automatically determine locations of stationary tags/items in real-time or near real-time, according to some embodiments. In some embodiments, an initial data set branch 302 may be performed before or simultaneous with a current data set branch 304.

With respect to the initial data set branch 302, at a block 306, the data aggregate module 206 may receive or obtain the initial tag-item holder pairs 202 and the initial tag-antenna pairs 204. The initial tag-item holder pairs 202 may be acquired by visual inspection and/or scan of at least a subset or all of the tags/items disposed on the item holders 140 throughout the space 108 during the initial time period before the current tag-antenna pairs 214 may be acquired, as discussed above. For example, which tag/item is disposed on which particular item holder, for all or a subset of the plurality of tags/items, may be manually captured by store employees to obtain a baseline, initial, snapshot, or ground truth data to facilitate subsequent tag location determination, for example, as items may be moved from their initial respective item holders over time. In some embodiments, the initial tag-antenna pairs 204 may comprise a data set acquired over a specified or pre-set time duration, such as 30 minutes. The initial tag-antenna pairs 204 may be generated by the plurality of antennas 118. Each antenna of the plurality of antennas 118 may detect one or more tags from among the plurality of tags during each detection time point or period within the specified or pre-set time duration. Tags which may be in sufficient proximity to a particular antenna may be detected by the particular antenna. When an antenna reads or detects a particular tag, at least an antenna identifier, a tag identifier, and a time stamp data may be associated with the event and the associated initial tag-antenna pair may similarly include at least such information. The initial tag-antenna pairs 204 over the specified time duration may be received by the computer unit 110 and then transmitted to the server 104, when, for example, filtering or other processes may be performed by the server 104.

Next at block 308, the filter module 208 may filter the initial tag-antenna pairs 204 to generate filtered initial tag-antenna pairs. In some embodiments, filter module 208 may perform at least two filtering operations. One of the filtering operations may comprise removing ones of the initial tag-antenna pairs 204 for which the respective tags do not have any matches to tags specified in the initial tag-item holder pairs 202. These tags may be filtered out because no ground truth data from the actual layout and placement within the space 108 may have been collected.

Another filtering operation may comprise removing ones of the initial tag-antenna pairs 204 for which respective tag reads by antennas may not be the respective tag's dominant antenna. In some embodiments, a particular tag may be read or detected by more than one antenna during the specified time duration. Among the detecting antennas for the particular tag, one of those antennas may read or detect the particular tag significantly more than the other detecting antennas. This particular antenna may be deemed to be the dominant antenna for the particular tag. In some embodiments, the antenna having a read or detection percentage above a pre-set threshold, such as 80%, may be deemed the dominant antenna for the particular tag.

For instance in the table below, the initial tag-antenna pairs 204 associated with tag #23 may be aggregated into counts of antenna reads or detection of tag #23 by respective antennas. The third row provides a count of the number of times a particular antenna read or detected tag #23. The fourth or last row provides those counts converted into percentage breakdown from among the five antennas.

|  | Antennas | | | | |
| --- | --- | --- | --- | --- | --- |
|  | SN00105 | SN00111 | SN00035 | SN01143 | SN00055 |
| Tag #23 | 13 | 268 | 10243 | 23 | 19 |
|  | 0.12 | 2.54 | 96.94 | 0.22 | 0.18 |

As shown, only antenna SN00035 has a percent of 96.94%, which is above the pre-set threshold of 80%. Accordingly, antenna SN00035 may be considered the dominant antenna for tag #23. The initial tag-antenna pairs corresponding to tag #23 and any of SN00105, SN00111, SN01143, and SN00055 may be removed from the initial tag-antenna pairs 204 data set. Such filtering operation may be performed for each tag specified in the initial tag-antenna pairs 204.

Upon completion of the filtering operations, the remaining ones of the initial tag-antenna pairs 204 may be considered the filtered initial tag-antenna pairs.

At block 310, the read rate module 210 may generate initial read or detection rates associated with the initial item holder-antenna pairs. In some embodiments, the read rate module 210 may calculate an initial read or detection rate for each of the initial item holder-antenna pairs in accordance with the filtered initial tag-antenna pairs and the initial tag-item holder pairs 202. For a given initial item holder-antenna pair, a count of all tag reads or detections for the given initial item holder-antenna pair and a count of unique tag reads or detections for the given initial item holder-antenna pair may be used in the following equation to calculate the associated initial read or detection rate:

Initial read or detection rate for a given initial item holder-antenna pair=(specified time duration*total tag reads for the given item holder-antenna pair)/(total time duration of initial data set*total unique tag reads for the given initial item holder-antenna pair).

The initial read or detection rate may be per a given initial item holder-antenna pair and per a specified time duration.

An example of initial read or detection rates for initial item holder-antenna pairs is shown in the table below.

| Initial item holder-antenna pairs | Initial read or detection rates |
|---|---|
| Shelf_E1_1-SN01157 | 1.034482759 |
| Shelf_F1-SN01229 | 10.34482759 |
| Table_T2_1-SN01157 | 2.586206897 |
| Shelf_D2_2-SN01157 | 1.681034483 |
| Shelf_B_B1-SN01238 | 1.034482759 |
| Shelf_H_H3-SN01131 | 1.034482759 |
| Rack_1-SN01172 | 1.034482759 |
| Shelf_F1_2-SN01229 | 3.842364532 |
| Table_1_2-SN01223 | 319.3103448 |
| Rack_2-SN01238 | 1.379310345 |
| Shelf_E1_2-SN01157 | 1.724137931 |
| Shelf_B_B1-SN01148 | 18.36206897 |
| Table1_1-SN01223 | 116.637931 |
| Shelf_D1-SN01147 | 1.647509579 |
| Shelf_C_C1-SN01148 | 23.79310345 |
| Shelf_H_H3-SN01139 | 1.379310345 |
| Table_T2-SN1215 | 193.9971851 |
| Shelf_A_A2-SN01238 | 1.681034483 |
| Table_T2_2-SN01147 | 19.50378469 |
| Table_T2_1-SN01203 | 8.275862069 |
| Shelf_H_H1-SN01225 | 15.17241379 |
| Shelf_F1_1-SN01229 | 566.7748479 |
| Shelf_H_H1-SN01224 | 1.034482759 |
| Shelf_H_H2-SN01204 | 109.2118227 |
| Shelf_G_G1-SN01148 | 1.034482759 |
| Shelf_F_F1-SN01229 | 383.7931034 |
| Shelf_D2_1-SN01157 | 1.494252874 |
| Shelf_G_G1-SN01224 | 1.034482759 |
| Shelf_J_J1-SN01153 | 14.06896552 |
| Shelf_K_K1-SN01153 | 1.034482759 |
| Shelf_A_A1-SN01172 | 1.034482759 |
| Shelf_A_A1-SN01131 | 5.172413793 |

In the current data set branch 304, blocks 312-316 may be performed in some embodiments. At block 312, the data aggregate module 206 may receive or obtain the current tag-antenna pairs 214 and the initial tag-item holder pairs 202. In some embodiments, when, for example, block 306 may be performed before block 312, the initial tag-item holder pairs 202 need not be provided again to the data aggregate module 206. In some embodiments, the current tag-antenna pairs 214 may comprise a data set acquired over a specified or pre-set time duration, such as 30 minutes, after the time period in which the initial tag-antenna pairs 204 may have been acquired. The current tag-antenna pairs 214 may be generated by the plurality of antennas 118. Each antenna of the plurality of antennas 118 may detect one or more tags from among the plurality of tags during each detection time point or period within the specified or pre-set time duration. Tags which may be in sufficient proximity to a particular antenna may be detected by the particular antenna. When an antenna reads or detects a particular tag, at least an antenna identifier, a tag identifier, and a time stamp data may be associated with the event and the associated current tag-antenna pair may similarly include at least such information. The current tag-antenna pairs 214 over the specified time duration may be received by the computer unit 110 and then transmitted to the server 104, when, for example, filtering or other processes may be performed by the server 104.

Next at block 314, the filter module 208 may filter the current tag-antenna pairs 214 to generate filtered current tag-antenna pairs. In some embodiments, filter module 208 may perform at least two filtering operations similar to those described above for block 308, except the filtering operations may be performed on the current tag-antenna pairs 214 rather than the initial tag-antenna pairs 204. Upon completion of the filtering operations, the remaining ones of the current tag-antenna pairs 214 may be considered the filtered current tag-antenna pairs.

At block 316, the read rate module 210 may generate current read or detection rates associated with the filtered current tag-antenna pairs. In some embodiments, the read rate module 210 may calculate a current read or detection rate for a tag associated with each of the filtered current tag-antenna pairs per the specified time duration. For a given filtered current tag-antenna pair, a count of all tag reads or detections for the given filtered current tag-antenna pair may be used in the following equation to calculate the associated current read or detection rate:

Current read or detection rate for a given filtered current tag-antenna pair=(specified time duration*total tag reads for the given filtered current tag-antenna pair)/(total time duration of current data set).

Upon generation of both the plurality of initial read or detection rates and the plurality of current read or detection rates, process 300 may proceed to block 318. The match module 212 may determine one or more current item holders associated (or matched) with each of one or more respective tags associated with the items. In some embodiments, one or more current item holders most likely to be where a particular tag/item may be located may be identified by the match module 212 in accordance with the initial read or detection rates and the current read or detection rates. Such identification may be performed for each tag (or a subset) of the plurality of tags within the space 108.

In some embodiments, one or more than one matching techniques may be implemented to determine the item holder(s) matching a particular tag. For instance, a threshold matching technique may be implemented, in which for the current read or detection rate associated with a given current tag-antenna pair (and hence, a given tag associated with the given current tag-antenna pair), the match module 212 may: (1) search for the initial read or detection rates associated with the same antenna as the antenna in the given current tag-antenna pair, and (2) among those initial read or detection rates associated with the same antenna, identify the one(s) that are within a pre-set range of the current read or detection rate of the given current tag-antenna pair. Then, (3) the particular item holder(s) associated with the initial read or detection rates identified as being within the pre-set range (the particular item holder(s) identified from the filtered initial item holder-antenna pairs associated with the initial read or detection rates) may comprise the matching item holder(s) for the given tag. In some embodiments, the pre-set range (also referred to as a threshold) may be + or −30% of the initial read or detection rate. In other words, when the current read or detection rate of the given current tag-antenna pair may be within 70% to 130% of particular initial read or detection rate(s) from among the initial read or detection rates associated with the same antenna, the item holder(s) associated with those initial read or detection rates may be deemed to be the matching item holder(s). In some embodiments, more than one item holder may be identified for the given tag.

For example, consider a current read or detection rate of 1.8 for a particular current tag-antenna pair comprising tag 3014 and antenna SN01157.

| Tag-Antenna Pair | Read-Rate |
|---|---|
| 3014-SN01157 | 1.8 |

Assume the following initial read or detection rates for the filtered initial item holder-antenna pairs.

| Item holder-antenna pairs | Read rate |
|---|---|
| Shelf_A_A1-SN01238 | 2.955665 |
| Shelf_A_A2-SN01238 | 1.750939 |
| Shelf_B_B1-SN01148 | 15.49569 |
| Shelf_C_C1-SN01148 | 87.00251 |
| Shelf_D1-SN01147 | 2.332465 |
| Shelf_D2_2-SN01157 | 1.793481 |
| Shelf_D2_3-SN01157 | 1.034483 |
| Shelf_E1_1-SN01157 | 1.137931 |
| Shelf_E1_2-SN01157 | 1.206897 |
| Shelf_F_F1-SN01229 | 177.1182 |
| Shelf_F1-SN01229 | 245.968 |
| Shelf_F1_1-SN01229 | 980.1747 |
| Shelf_F1_2-SN01229 | 47.5526 |
| Shelf_G_G1-SN01224 | 10.12016 |
| Shelf_H_H1-SN01225 | 43.19089 |
| Shelf_H_H2-SN01204 | 1.537356 |
| Shelf_H_H3-SN01139 | 26.8209 |
| Shelf_J_J1-SN01153 | 1.758368 |
| Shelf_K_K1-SN01153 | 2.272546 |

Among the filtered initial item holder-antenna pairs above, four of the pairs are associated with the same antenna SN01157 as the particular current tag-antenna pair comprising tag 3014. These four pairs are bolded in the table above.

Next, for these four pairs, each of its associated initial read or detection rates may be calculated at 70% and 130% of itself, as respectively shown in the third and fourth columns below.

| Item holder-antenna pairs | Initial read rates | Threshold minimum calculated read rates | Threshold maximum calculated read rates |
|---|---|---|---|
| Shelf_D2_2-SN01157 | 1.793481 | 1.255 | 2.332 |
| Shelf_D2_3-SN01157 | 1.034483 | 0.724 | 1.345 |
| Shelf_E1_1-SN01157 | 1.137931 | 0.797 | 1.479 |
| Shelf_E1_2-SN01157 | 1.206897 | 0.845 | 1.569 |

Among the threshold minimum and maximum read rate values above, the current read rate of 1.8 for the particular tag 3014 only falls within the threshold minimum value 1.255 and threshold maximum value 2.332 for the Shelf_D2_2-SN01157 pair. For the remaining three pairs, the current read rate of 1.8 falls outside each of the respective threshold minimum and maximum values. Accordingly, Shelf_D2_2 may be considered the matching item holder for the particular tag 3014, and Shelf_D2_2 may be the most likely item holder at which the item associated with the particular tag 3014 may be currently located. The corresponding current tag-item holder pair may be 3014-Shelf_D2_2.

In the above example, if more than one item holders are deemed to be a match to the particular tag, then the particular tag may be deemed to be located in an area including all of the matched item holders (e.g., within the sporting department, northwest quadrant of the space 108, etc.) rather than at particular item holders.

Another matching technique that may be implemented by the match module 212 may comprise a nearest distance matching technique. In the nearest distance matching technique, for the current read or detection rate associated with a given current tag-antenna pair (and hence, a given tag associated with the given current tag-antenna pair), the match module 212 may: (1) search for the initial read or detection rates associated with the same antenna as the antenna in the given current tag-antenna pair, and (2) among those initial read or detection rates associated with the same antenna, identify the one that has the smallest difference with (or the nearest distance or value to) the current read or detection rate associated with the given tag. The item holder associated with the initial read or detection rate with the smallest difference may be deemed to be the matching item holder to the particular tag.

Continuing the example above for a current read or detection rate of 1.8 for a particular current tag-antenna pair comprising tag 3014 and antenna SN01157, the same four initial read or detection rates as discussed above may be identified because they are those associated with the same antenna SN01157 as the particular tag 3014. Next, the difference between each of these initial read or detection rates to the current read or detection rate 1.8 may be calculated as shown in the last column of the table below.

| Item holder-antenna pairs | Initial read rates | Calculated difference between initial read rate and particular current read rate |
|---|---|---|
| Shelf_D2_2-SN01157 | 1.793481 | 0.006519 |
| Shelf_D2_3-SN01157 | 1.034483 | 0.765517 |
| Shelf_E1_1-SN01157 | 1.137931 | 0.662069 |
| Shelf_E1_2-SN01157 | 1.206897 | 0.593103 |

As can be seen above, the smallest difference may be found for the Shelf_D2_2-SN01157 pair (bolded in the table above). Hence, the particular item holder may comprise the matching item holder or the one most likely to be the current location at which the particular tag 3014 may be found.

In some embodiments, the match module 212 may implement more than one matching techniques, such as the threshold matching technique and nearest distance matching technique described above, and select a final matching item holder from among the candidate item holder(s) identified from the implemented matching techniques. The final matching item holder may be the item holder that is identified by a majority of the matching techniques.

Once at least one current matching item holder is identified for each of the tags of the plurality of tags at block 318, the matching item holder(s) may be provided for display at block 320. In some embodiments, a person (e.g., store employee) may interface with the computer unit 110 and request the location of a particular item. In response, the match module 212 may access current tag-item holder pairs 216 data (e.g., stored in database 106) to look up the current item holder associated with the particular item of interest.

Upon completion of blocks 318 and/or 320, process 300 may return to block 312 for the next set of current tag-antenna pairs acquired during a third time period, wherein the previous set of current tag-antenna pairs may have been acquired during the second time period before the third time period.

Figure 4:
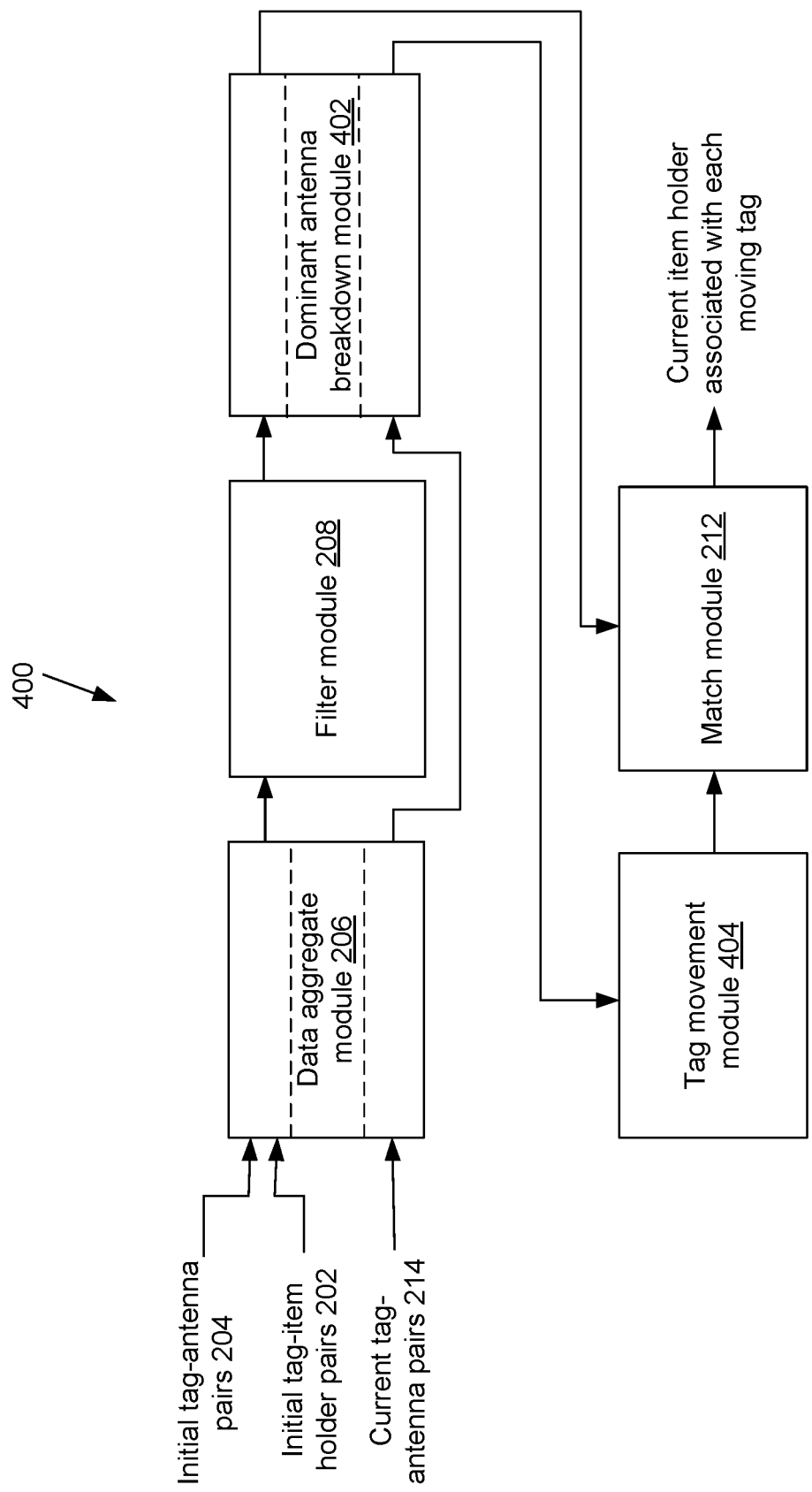
FIG. 4 depicts an example block diagram illustrating a logical view of the system of FIG. 1, the block diagram illustrating algorithmic structures included in the system of FIG. 1 and data associated with the processes performed by the algorithmic structures to facilitate identification of moving tags and their new locations, according to some embodiments.

In some embodiments, tags from among the plurality of tags that may be moving within the space 108 may be identified and their new locations (e.g., new associated item holders) may be automatically determined as described in detail below in conjunction with FIGS. 4-5. FIG. 4 depicts an example block diagram 400 illustrating a logical view of the system 100, block diagram 400 illustrating algorithmic structures included in system 100 and data associated with the processes performed by the algorithmic structures to facilitate identification of moving tags and their new locations, according to some embodiments. The various components and/or data of FIG. 4 may be implemented at least partially by hardware at one or more computing devices, such as one or more hardware processors executing instructions stored in one or more memories for performing various functions described herein. The components and/or data may be communicatively coupled (e.g., via appropriate interfaces) to each other and to various data sources, so as to allow information to be passed between the components and/or to share and access common data. FIG. 4 illustrates only one of many possible arrangements of components and data configured to perform the functionalities described herein. Other arrangements may include fewer or different components and/or data, and the division of work between the components and/or data may vary depending on the arrangement. In some embodiments, modules 206-208, 212, 402-404 may comprise one or more software components, programs, applications, or other units of code base or instructions configured to be executed by one or more processors included in the server 102 and/or computer unit 110. Although modules 206-208, 212, 402-404 may be depicted as distinct components in FIG. 4, modules 206-208, 212, 402-404 may be implemented as fewer or more components than illustrated.

In some embodiments, locations of moving items may be determined based on three data sets: initial tag-item holder pairs 202, initial tag-antenna pairs 204, and current tag-antenna pairs 214. In some embodiments, the initial tag-item holder pairs 202 and initial tag-antenna pairs 204 may comprise inputs to the data aggregate module 206. Data aggregate module 206 and then filter module 208 may similarly handle the initial tag-item holder pairs 202 and the initial tag-antenna pairs 204 as discussed above in connection with FIG. 2.

The output of the filter module 208, the filtered initial tag-antenna pairs, may be provided to the dominant antenna breakdown module 402. In some embodiments, the dominant antenna breakdown module 402 may be configured to calculate the initial dominant antenna breakdown values for each item holder (of initial item holder-antenna pairs) per the specified time duration based on the filtered initial tag-antenna pairs and the initial tag-item holder pairs 202. The dominant antenna breakdown values may comprise percentage breakdowns of each specific tag reads or detections by a given antenna relative to all tags read or detected by the given antenna during the specified time duration. The calculated initial dominant antenna breakdown values may comprise an input to the match module 212.

In some embodiments, the current tag-antenna pairs 214 may be received by the data aggregate module 206 and handled similar to that discussed above in connection with FIG. 2. Current tag-antenna pairs 214 may be processed by the tag movement module 404 as described in detail in conjunction with FIG. 5. The current tag-antenna pairs 214 may be received by the dominant antenna breakdown module 402, and the module 402 may be configured to calculate current dominant antenna breakdown values associated with the current tag-antenna pairs 214. In some embodiments, a current dominant antenna breakdown value may be calculated for a tag associated with each current tag-antenna pair 214 per 5 minutes of antenna reads, for each sliding successive 5 minutes of antenna reads.

The tag movement module 404 may be configured to determine which ones of the plurality of tags moved (during the specified time duration) based on detection of changes in the current dominant antenna breakdown values of each given tag across different time window slices that exceed a pre-set threshold, such as 20%. Additional details regarding determination of tag movement identification may be provided in conjunction with FIG. 5.

For each of the specific tags identified as moving by the tag movement module 404, the match module 212 may be configured to determine the item holder most likely to be the current location at which the respective moving tag may be located in accordance with the current dominant antenna breakdowns. In some embodiments, for each moving tag, the match module 212 may search for the item holder associated with the closest total summation difference between the item holder's initial dominant antenna breakdown and the particular moving tag's current dominant antenna breakdown.

In some embodiments, various data such as, but not limited to, the initial tag-item holder pairs 202, initial tag-antenna pairs 204, current tag-antenna pairs 214, dominant antenna breakdowns, determined current locations of moving tags, and the like may be stored in database 106 and/or computer unit 110. Such data may be organized in particular data structures, data tables, data spreadsheets, relational data scheme, and the like suitable for archival, selective retrieval, and the like.

Figure 5:
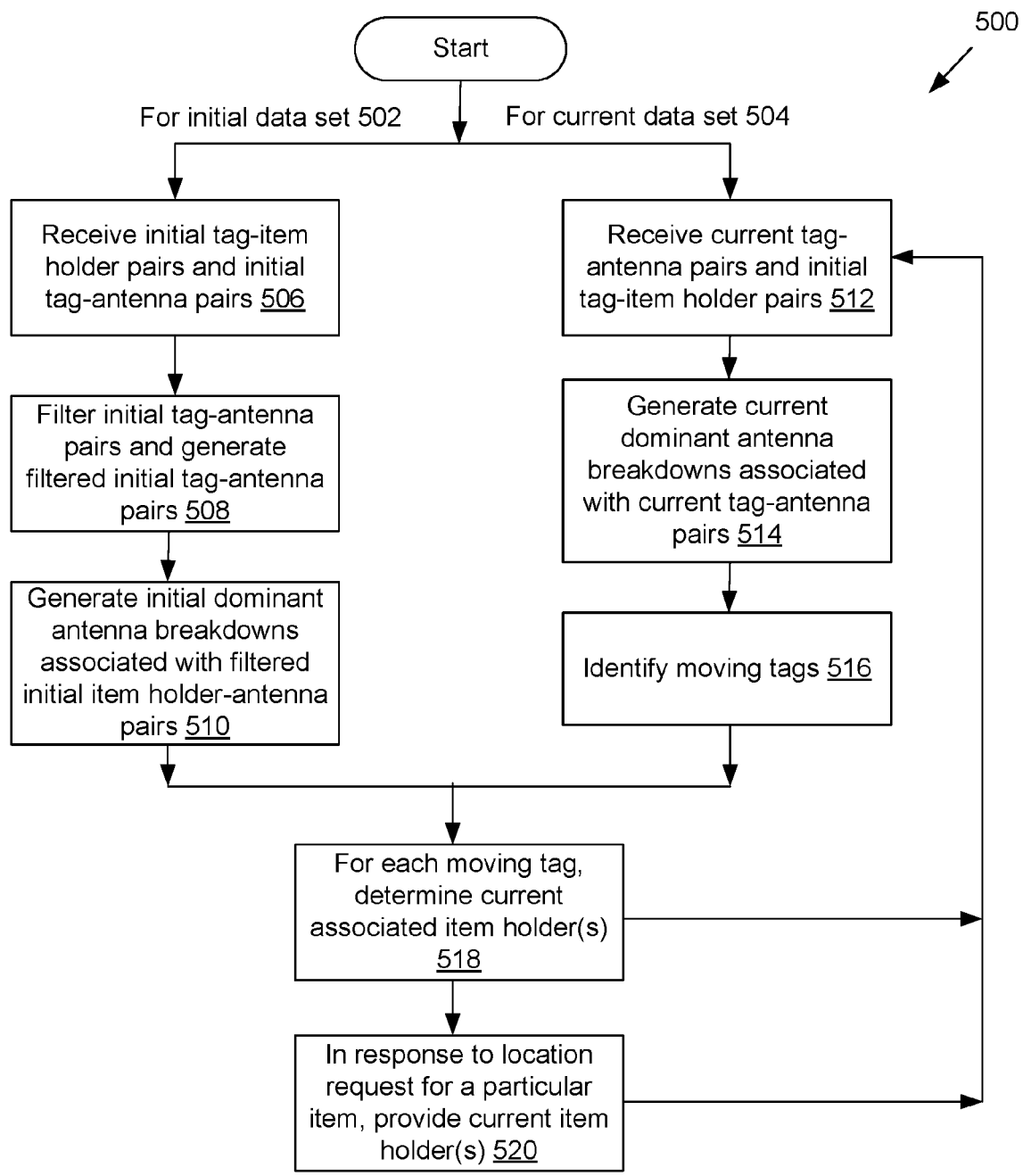
FIG. 5 depicts an example process to automatically determine locations of moving tags in real-time or near real-time, according to some embodiments.

FIG. 5 depicts an example process 500 to automatically determine locations of moving tags in real-time or near real-time, according to some embodiments. In some embodiments, an initial data set branch 502 may be performed before or simultaneous with a current data set branch 504.

With respect to the initial data set branch 502, at a block 506, the data aggregate module 206 may receive or obtain the initial tag-item holder pairs 202 and the initial tag-antenna pairs 204. Block 506 may be similar to block 306 of FIG. 3. At a block 508, the initial tag-antenna pairs 204 may be filtered by the filter module 208 and filtered initial tag-antenna pairs may be generated, similar to the discussion above with respect to block 308.

Next at block 310, the dominant antenna breakdown module 302 may generate or calculate initial dominant antenna breakdowns associated with the filtered initial item holder-antenna pairs. In some embodiments, an initial dominant antenna breakdown percentage may be calculated for each initial item holder-antenna pairs based on the filtered initial item holder-antenna pairs over the specified duration, such as 30 minutes, and the initial tag-item holder pairs 202. In some embodiments, an initial dominant antenna breakdown for a given item holder-antenna pair may be calculated as follows:

Initial dominant antenna breakdown for a given item holder-antenna pair=(Count of all tag reads for the given item holder-antenna pair)/(Count of all tag reads for the given item holder).

The initial dominant antenna breakdowns may also be referred to as ground truth dominant antenna breakdowns.

As an example, counts of reads or detections of tags associated with the shelf A-antenna SN01210 pair, the shelf A-antenna SN01276 pair, and the shelf A-antenna SN01277 pair may comprise 20, 52, and 21, respectively. And the total count of tag reads or detections for shelf A may thus be 93 (=20+52+21). The dominant antenna breakdown for the shelf A-antenna SN01210 pair may equal 0.215053763 (=20/93), for the shelf A-antenna SN01276 pair may equal 0.559139785 (=52/93), and for the shelf A-antenna SN01277 pair may equal 0.225806452 (=21/93). The sum of all the dominant antenna breakdowns for shelf A may equal 1.0 or 100%. These dominant antenna breakdown percentages are also provided in the table below.

| Item holder-antenna pairs | Count of tag reads or detections | Dominant antenna breakdowns |
|---|---|---|
| A-SN01210 | 20 | 0.215053763 |
| A-SN01276 | 52 | 0.559139785 |
| A-SN01277 | 21 | 0.225806452 |
| Total reads for item holder A | 93 | 1 |

In the current data set branch 504, block 512 may be performed similar to block 312 of FIG. 3. Next at block 514, the dominant antenna breakdown module 402 may generate current dominant antenna breakdowns associated with the current tag-antenna pairs for the specified time duration, such as 30 minutes. A current dominant antenna breakdown percentage or value may be calculated for a tag associated with a given current tag-antenna pair for each specific time window of a plurality of time windows within the specific time duration. For instance, each time window may comprise a 5 minute window and the plurality of time windows may comprise successive sliding 5 minutes windows covering the first 5 minutes of the specified time duration to the last 5 minutes of the specified time duration. In some embodiments, a current dominant antenna breakdown for a tag associated with a given current tag-antenna pair for a specific time window may be calculated as follows:

Current dominant antenna breakdown for a tag associated with a given current tag-antenna pair for a specific time window=(Count of all tag reads for the given tag-antenna pair within the specific time window)/(Count of all tag reads by antennas for the tag associated with the given tag-antenna pair for the specific time window).

At block 516, the tag movement module 404 may identify the tags that move during the specified time duration from among the plurality of tags. In some embodiments, for each tag of the plurality of tags, a sliding window mechanism may be used to detect changes in the current dominant antenna breakdown of a tag that may exceed a pre-set threshold. In some embodiments, an overall window size of 15 minutes, a sliding window of 5 minutes, the pre-set threshold of 20% may be used. Using these parameters, the current dominant antenna breakdowns for a given tag may be calculated using antenna reads from the first 15 minutes time frame. Because a 5 minute sliding window may be used, each successive current dominant antenna breakdown for the given tag may include the next 5 minutes of antenna reads and drop the previous first 5 minutes of antenna reads. For example, a first current dominant antenna breakdown for the given tag may be calculated for antenna reads associated with time stamp 11:00-11:15, a second current dominant antenna breakdown for the given tag may be calculated for antenna reads associated with time stamp 11:05-11:20, a third current dominant antenna breakdown for the given tag may be calculated for antenna reads associated with time stamp 11:10-11:25, and the like for a total of five successive current dominant antenna breakdowns for the given tag (for the 30 minute time duration).

For each given tag, if a difference in successive sliding window's current dominant antenna breakdowns for any current tag-antenna pair associated with the given tag exceeds the pre-set threshold, such as 20%, then the given tag may be classified as a "moved" tag. The current dominant antenna breakdown of the previous sliding window and that of the current sliding window may be compared for potential changes. Such pairs of sliding windows may be compared until the last current sliding window may comprise the last sliding window (e.g., 11:15-11:30 time stamp) of the specified time duration. In the example table below, the second column denotes a current dominant antenna breakdown for an i+1th sliding window, the third column denotes a current dominant antenna breakdown for an i+1th sliding window, and the fourth column denotes the difference between the third and fourth columns. In the table below, tag 3014-antenna SN01204 pair (bolded row) has a difference of 200%, which exceeds the 20% pre-set threshold. Accordingly, tag 3014 may be classified as a "moved" tag to be further processed in block 520.

| Current Tag-antenna pairs | Current Dominant antenna breakdown for previous sliding window (in percent) | Current Dominant antenna breakdown for current sliding window (in percent) | Difference (in percent) |
|---|---|---|---|
| 3014-SN01224 | 5% | 5% | 0% |
| 3014-SN01225 | 85% | 74% | 12.9% |
| 3014-SN01204 | 5% | 15% | 200% |
| 3014-SN01139 | 6% | 6% | 0% |

If no difference in the current dominant antenna breakdown values exceeds the threshold, then the given tag may not be classified as "moved," and the given tag need not be matched in block 518.

Next at block 518, for those tags classified or identified as "moved" tags in block 518, the match module 212 may determine a current item holder associated with each of the "moved" tags. In some embodiments, for each "moved" tag, the match module 212 may search among the initial dominant antenna breakdown values associated with the initial item holder-antenna pairs that may be the least total summation difference with the "moved" tag's current dominant antenna breakdown.

For example, consider a "moved" tag having the following current dominant antenna breakdowns, which may be the same as the "moved" tag discussed immediately above.

| Current Tag-antenna pairs | Current Dominant antenna breakdown for current sliding window (in percent) |
|---|---|
| 3014-SN01224 | 5% |
| 3014-SN01225 | 74% |
| 3014-SN01204 | 15% |
| 3014-SN01139 | 6% |

And assume the following initial dominant antenna breakdowns.

| Initial Item holder-antenna pairs | Initial dominant antenna breakdown |
|---|---|
| Shelf_A_A1SN01131 | 0.05 |
| Shelf_A_A1-SN01139 | 0.025 |
| Shelf_A_A1-SN01147 | 0.088676 |
| Shelf_A_A1-SN01172 | 0.179138 |
| Shelf_A_A1-SN01183 | 0.025 |
| Shelf_A_A1-SN01223 | 0.071864 |
| Shelf_A_A1-SN01238 | 0.475523 |
| Shelf_A_A1-SN01240 | 0.044338 |
| Shelf_A_A1-SN01241 | 0.077221 |
| Shelf_A_A1-SN01215 | 0.026481 |
| Shelf_C_C1-SN01148 | 0.789547 |
| Shelf_C_C1-SN01224 | 0.190716 |
| Shelf_C_C1-SN01238 | 0.039474 |

The information in the immediate two tables above may be combined into a single table for each item holder, in which the last column may comprise the difference between the second and third columns of initial and current dominant antenna breakdowns. The table below corresponds to the item holder Shelf_A_A1.

| Initial Item holder-antenna pairs | Initial dominant antenna breakdown | Current Dominant antenna breakdown for current sliding window | Difference |
|---|---|---|---|
| Shelf_A_A1SN01131 | 0.05 | 0 | 0.05 |
| Shelf_A_A1-SN01139 | 0.025 | 0.06 | 0.035 |
| Shelf_A_A1-SN01147 | 0.088676 | 0 | 0.088676 |
| Shelf_A_A1-SN01172 | 0.179138 | 0 | 0.179138 |
| Shelf_A_A1-SN01183 | 0.025 | 0 | 0.025 |
| Shelf_A_A1-SN01223 | 0.071864 | 0 | 0.071864 |
| Shelf_A_A1-SN01238 | 0.475523 | 0 | 0.475523 |
| Shelf_A_A1-SN01240 | 0.044338 | 0 | 0.044338 |
| Shelf_A_A1-SN01241 | 0.077221 | 0 | 0.077221 |
| Shelf_A_A1-SN01215 | 0.026481 | 0 | 0.026481 |
| Total difference summation | | | 1.04676 |

And the table below corresponds to item holder Shelf_C_C1.

| Initial Item holder-antenna pairs | Initial dominant antenna breakdown | Current Dominant antenna breakdown for current sliding window | Difference |
|---|---|---|---|
| Shelf_C_C1-SN01148 | 0.789547 | 0 | 0.789547 |
| Shelf_C_C1-SN01224 | 0.190716 | 0.05 | 0.140716 |
| Shelf_C_C1-SN01238 | 0.039474 | 0 | 0.039474 |
| Total difference summation | | | 0.969737 |

Among all of the item holders, as shown in the two difference tables above, the total difference 0.969737 associated with Shelf_C_C1 is smaller than the total difference 1.04676 associated with Shelf_A_A1. Accordingly, item holder Shelf_C_C1 may be deemed to be the most likely current item holder on which "moved" tag 3014 may be located. Similar determinations may be performed for each of the "moved" tags to identify respective current item holders.

Once at least one current matching item holder is identified for each of the "moved" tags at block 518, the matching item holders may be provided for display at block 520. In some embodiments, a person (e.g., store employee) may interface with the computer unit 110 and request the location of a particular item. In response, the match module 212 may access matching item holder data (e.g., stored in database 106) to look up the current item holder associated with the particular item of interest.

Upon completion of blocks 518 and/or 520, process 500 may return to block 512 for the next set of current tag-antenna pairs acquired during a third time period, wherein the previous set of current tag-antenna pairs may have been acquired during the second time period before the third time period.

In this manner, computationally efficient techniques may be implemented to continuously determine item holders associated with particular tags/items, in which one or more of the tags may be stationary and/or moving within the space 108 over time. Complex training or machine learning techniques need not be employed. The techniques described herein may also be scalable and thus may be deployed in spaces of any size and in any number of spaces.

Figure 6:
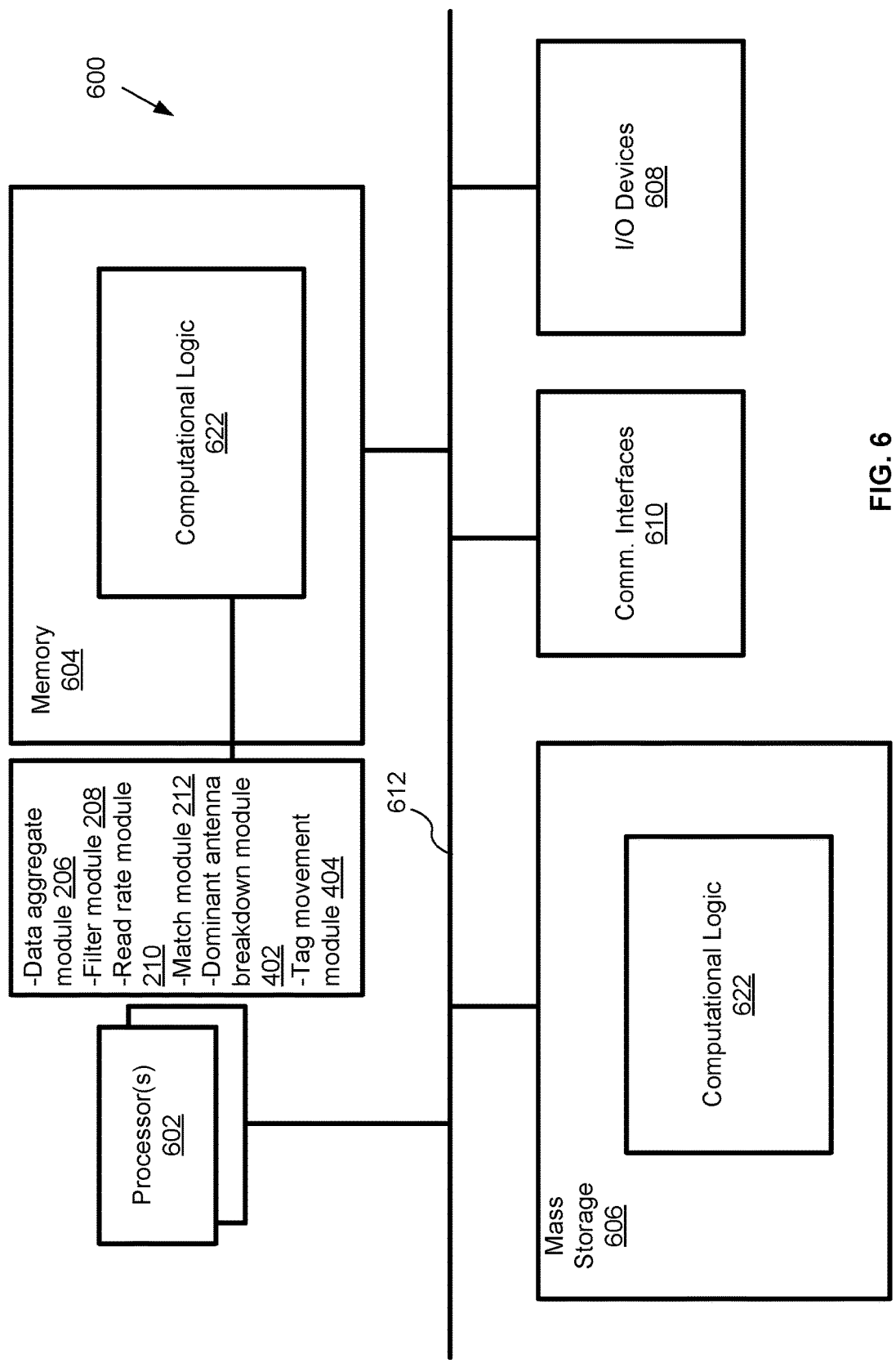
FIG. 6 illustrates an example computer device suitable for use to practice aspects of the present disclosure, in accordance with various embodiments.

FIG. 6 illustrates an example computer device 600 suitable for use to practice aspects of the present disclosure, in accordance with various embodiments. In some embodiments, computer device 600 may comprise any of the server 104, database 104, and/or computer unit 110. As shown, computer device 600 may include one or more processors 602, and system memory 604. The processor 602 may include any type of processors. The processor 602 may be implemented as an integrated circuit having a single core or multi-cores, e.g., a multi-core microprocessor. The computer device 600 may include mass storage devices 606 (such as diskette, hard drive, volatile memory (e.g., DRAM), compact disc read only memory (CD-ROM), digital versatile disk (DVD), flash memory, solid state memory, and so forth). In general, system memory 604 and/or mass storage devices 606 may be temporal and/or persistent storage of any type, including, but not limited to, volatile and non-volatile memory, optical, magnetic, and/or solid state mass storage, and so forth. Volatile memory may include, but not be limited to, static and/or dynamic random access memory. Non-volatile memory may include, but not be limited to, electrically erasable programmable read only memory, phase change memory, resistive memory, and so forth.

The computer device 600 may further include input/output (I/O) devices 608 (such as a display 602), keyboard, cursor control, remote control, gaming controller, image capture device, and so forth and communication interfaces 610 (such as network interface cards, modems, infrared receivers, radio receivers (e.g., Bluetooth)), and so forth.

The communication interfaces 610 may include communication chips (not shown) that may be configured to operate the device 600 in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. The communication chips may also be configured to operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chips may be configured to operate in accordance with Code Division Multiple Access (CDMA), Time Division Multiple Access (TDMA), Digital Enhanced Cordless Telecommunications (DECT), Evolution-Data Optimized (EV-DO), derivatives thereof, as well as any other wireless protocols that are designated as 3G, 4G, 5G, and beyond. The communication interfaces 610 may operate in accordance with other wireless protocols in other embodiments.

The above-described computer device 600 elements may be coupled to each other via a system bus 612, which may represent one or more buses. In the case of multiple buses, they may be bridged by one or more bus bridges (not shown). Each of these elements may perform its conventional functions known in the art. In particular, system memory 604 and mass storage devices 606 may be employed to store a working copy and a permanent copy of the programming instructions implementing the operations associated with system 100, e.g., operations associated with providing data aggregate module 206, filter module 208, read rate module 210, match module 212, dominant antenna breakdown module 402, and/or tag movement module 404 as described above, generally shown as computational logic 622. Computational logic 622 may be implemented by assembler instructions supported by processor(s) 602 or high-level languages that may be compiled into such instructions. The permanent copy of the programming instructions may be placed into mass storage devices 606 in the factory, or in the field, through, for example, a distribution medium (not shown), such as a compact disc (CD), or through communication interfaces 610 (from a distribution server (not shown)).

FIG. 7 illustrates an example non-transitory computer-readable storage media 702 having instructions configured to practice all or selected ones of the operations associated with the processes described above. As illustrated, non-transitory computer-readable storage medium 702 may include a number of programming instructions 704 (e.g., data aggregate module 206, filter module 208, read rate module 210, match module 212, dominant antenna breakdown module 402, and/or tag movement module 404). Programming instructions 704 may be configured to enable a device, e.g., computer device 600, in response to execution of the programming instructions, to perform one or more operations of the processes described in reference to FIGS. 1-5. In alternate embodiments, programming instructions 704 may be disposed on multiple non-transitory computer-readable storage media 702 instead. In still other embodiments, programming instructions 804 may be encoded in transitory computer-readable signals.

Referring again to FIG. 6, the number, capability, and/or capacity of the elements 608, 610, 612 may vary, depending on whether computer device 600 is used as a stationary computing device, such as a set-top box or desktop computer, or a mobile computing device, such as a tablet computing device, laptop computer, game console, an Internet of Things (IoT), or smartphone. Their constitutions are otherwise known, and accordingly will not be further described.

At least one of processors 602 may be packaged together with memory having computational logic 622 configured to practice aspects of embodiments described in reference to FIGS. 1-5. For example, computational logic 622 may be configured to include or access data aggregate module 206, filter module 208, read rate module 210, match module 212, dominant antenna breakdown module 402, and/or tag movement module 404. In some embodiments, at least one of the processors 602 may be packaged together with memory having computational logic 622 configured to practice aspects of processes 300, 500 to form a System in Package (SiP) or a System on Chip (SoC).

In various implementations, the computer device 600 may comprise a laptop, a netbook, a notebook, an ultrabook, a smartphone, a tablet, an Internet of Things (IoT) device, a personal digital assistant (PDA), an ultra mobile PC, a mobile phone, a desktop computer, a server, a printer, a scanner, a monitor, a set-top box, an entertainment control unit, a digital camera, a portable music player, or a digital video recorder. In further implementations, the computer device 600 may be any other electronic device that processes data.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein.

Examples of the devices, systems, and/or methods of various embodiments are provided below. An embodiment of the devices, systems, and/or methods may include any one or more, and any combination of, the examples described below.

Example 1 is an apparatus including one or more storage medium is to store mappings; and one or more processors in communication with the one or more storage medium, wherein the one or more processors is to generate a current detection rate by one or more antennas, of a plurality of antennas, for each tag identified in a plurality of filtered current tag to antenna mappings over a pre-set time duration, wherein the one or more processors is to determine at least one item holder, from among a plurality of item holders, at which each respective tag identified in the plurality of filtered current tag to antenna mappings is most likely to be currently located, to provide a location of an item, based on the current detection rate for each respective tag and a plurality of initial detection rates associated with a plurality of initial item holder to antenna mappings, and wherein the plurality of filtered current tag to antenna mappings define associations between select ones of a plurality of tags associated with items to select ones of the plurality of item holders that hold the items, select ones of the plurality of tags to be detected by select ones of the plurality of antennas when in proximity to each other.

Example 2 may include the subject matter of Example 1, and may further include wherein each tag of the plurality of tags is coupled to an item from among a plurality of items located within a space.

Example 3 may include the subject matter of any of Examples 1-2, and may further include wherein the plurality of items comprises inventory objects, items available for purchase in the space, items to be tracked within the space, apparel, shoes, accessories, sporting equipment, electronics, furniture, and furnishings.

Example 4 may include the subject matter of any of Examples 1-3, and may further include wherein the space comprises a store, a warehouse, an office, a business, a building, a house, a school, a room, a vehicle, a transport, or a part of any of the store, warehouse, office, business, building, house, school, room, vehicle, or transport, or a defined physical space.

Example 5 may include the subject matter of any of Examples 1-4, and may further include wherein the one or more processor is to generate the plurality of initial item holder to antenna mappings based on a plurality of initial tag to item holder mappings and a plurality of initial tag to antenna mappings.

Example 6 may include the subject matter of any of Examples 1-5, and may further include wherein the plurality of initial tag to item holder mappings comprises all or a subset of tags, of the plurality of tags, actually disposed on select ones of the plurality of item holders during a time period prior to a current time period associated with the plurality of filtered current tag to antenna mappings.

Example 7 may include the subject matter of any of Examples 1-6, and may further include wherein the one or more processors is to remove select ones of a plurality of current tag to antenna mappings based on a plurality of initial tag to item holder mappings to generate the plurality of filtered current tag to antenna mappings.

Example 8 may include the subject matter of any of Examples 1-7, and may further include wherein the one or more processors is to remove select ones of the plurality of current tag to antenna mappings comprises the one or more processors to remove ones of the plurality of current tag to antenna mappings for which a tag associated with the plurality of current tag to antenna mappings does not have a match to a tag from among the plurality of initial tag to item holder mappings.

Example 9 may include the subject matter of any of Examples 1-8, and may further include wherein the one or more processors is to remove select ones of the plurality of current tag to antenna mappings comprises the one or more processors: for each tag associated with the plurality of current tag to antenna mappings, to determine a dominant antenna associated with a tag from among antennas mapped to the tag in the plurality of current tag to antenna mappings; and to retain only ones of the plurality of current tag to antenna mappings for which the associated antennas are the dominant antenna for each respective tag, the retained ones of the plurality of current tag to antenna mappings to comprise the plurality of filtered current tag to antenna mappings.

Example 10 may include the subject matter of any of Examples 1-9, and may further include wherein the one or more processors is to determine at least one item holder, from among the plurality of item holders, at which each respective tag identified in the plurality of filtered current tag to antenna mappings is most likely to be currently located comprises, for each one of the plurality of filtered current tag to antenna mappings, the one or more processors: to identify ones of the plurality of initial detection rates associated with a same antenna as the one of the plurality of filtered current tag to antenna mappings; and to determine one or more of the initial detection rates, from among the identified ones of the plurality of initial detection rates, within a pre-set range of the current detection rate associated with a tag of the one of the plurality of filtered current tag to antenna mappings, wherein one or more of the item holders associated with the respective one or more of the initial detection rates within the pre-set range of the current detection rate comprises the at least one item holder at which the tag is most likely to be currently located.

Example 11 may include the subject matter of any of Examples 1-10, and may further include wherein the pre-set range is within 70 to 130% of the current detection rate associated with a tag of the one of the plurality of filtered current tag to antenna mappings.

Example 12 may include the subject matter of any of Examples 1-11, and may further include wherein the one or more processors is to determine at least one item holder, from among the plurality of item holders, at which each respective tag identified in the plurality of filtered current tag to antenna mappings is most likely to be currently located comprises, for each one of the plurality of filtered current tag to antenna mappings, the one or more processors: to identify ones of the plurality of initial detection rates associated with a same antenna as the one of the plurality of filtered current tag to antenna mappings; and to identify one of the initial detection rates, from among the identified ones of the plurality of initial detection rates, having a least difference from the current detection rate associated with a tag of the one of the plurality of filtered current tag to antenna mappings, in comparison to remaining ones of the identified ones of the plurality of initial detection rates, wherein the item holder associated with the identified one of the initial detection rates comprises the at least one item holder at which the tag is most likely to be currently located.

Example 13 is a computer-implemented method including generating a current detection rate by one or more antennas, from among a plurality of antennas, for each tag identified in a plurality of filtered current tag to antenna mappings, the current detection rate by the one or more antennas over a pre-set time duration, wherein select ones of a plurality of tags are to be detected by select ones of the plurality of antennas when in proximity to each other and wherein the plurality of tags associated with items to select ones of a plurality of item holders that hold the items; and determining at least one item holder, from among the plurality of item holders, at which each respective tag identified in the plurality of filtered current tag to antenna mappings is most likely to be currently located to provide a location of the item, wherein determining the at least one item holder for each tag is based on the current detection rate for each respective tag and a plurality of initial detection rates associated with a plurality of initial item holder to antenna mappings.

Example 14 may include the subject matter of Example 13, and may further include wherein each tag of the plurality of tags is coupled to an item from among a plurality of items located within a space.

Example 15 may include the subject matter of any of Examples 13-14, and may further include wherein the plurality of items comprises inventory objects, items available for purchase in the space, items to be tracked within the space, apparel, shoes, accessories, sporting equipment, electronics, furniture, and furnishings.

Example 16 may include the subject matter of any of Examples 13-15, and may further include wherein the space comprises a store, a warehouse, an office, a business, a building, a house, a school, a room, a vehicle, a transport, or a part of any of the store, warehouse, office, business, building, house, school, room, vehicle, or transport, or a defined physical space.

Example 17 may include the subject matter of any of Examples 13-16, and may further include generating the plurality of initial item holder to antenna mappings based on the plurality of initial tag to item holder mappings and a plurality of initial tag to antenna mappings.

Example 18 may include the subject matter of any of Examples 13-17, and may further include wherein the plurality of initial tag to item holder mappings comprises all or a subset of tags, of the plurality of tags, actually disposed on select ones of the plurality of item holders during a time period prior to a current time period associated with the plurality of current tag to antenna mappings.

Example 19 may include the subject matter of any of Examples 13-18, and may further include removing select ones of a plurality of current tag to antenna mappings based on the plurality of initial tag to item holder mappings to generate the plurality of filtered current tag to antenna mappings.

Example 20 may include the subject matter of any of Examples 13-19, and may further include wherein removing select ones of the plurality of current tag to antenna mappings comprises removing ones of the plurality of current tag to antenna mappings for which a tag associated with the plurality of current tag to antenna mappings does not have a match to a tag from among the plurality of initial tag to item holder mappings.

Example 21 may include the subject matter of any of Examples 13-20, and may further include wherein removing select ones of the plurality of current tag to antenna mappings comprises, for each tag associated with the plurality of current tag to antenna mappings, determining a dominant antenna associated with a tag from among antennas mapped to the tag in the plurality of current tag to antenna mappings; and retaining only ones of the plurality of current tag to antenna mappings for which the associated antennas are the dominant antenna for each respective tag, the retained ones of the plurality of current tag to antenna mappings to comprise the plurality of filtered current tag to antenna mappings.

Example 22 may include the subject matter of any of Examples 13-21, and may further include wherein determining at least one item holder at which each respective tag identified in the plurality of filtered current tag to antenna mappings is most likely to be currently located comprises, for each one of the plurality of filtered current tag to antenna mappings, identifying ones of the plurality of initial detection rates associated with a same antenna as the one of the plurality of filtered current tag to antenna mappings; and determining one or more of the initial detection rates, from among the identified ones of the plurality of initial detection rates, within a pre-set range of the current detection rate associated with a tag of the one of the plurality of filtered current tag to antenna mappings, wherein one or more of the item holders associated with the respective one or more of the initial detection rates within the pre-set range of the current detection rate comprises the at least one item holder at which the tag is most likely to be currently located.

Example 23 may include the subject matter of any of Examples 13-22, and may further include wherein the pre-set range is within 70 to 130% of the current detection rate associated with a tag of the one of the plurality of filtered current tag to antenna mappings.

Example 24 may include the subject matter of any of Examples 13-23, and may further include wherein determining at least one item holder at which each respective tag identified in the plurality of filtered current tag to antenna mappings is most likely to be currently located comprises, for each one of the plurality of filtered current tag to antenna mappings, identifying ones of the plurality of initial detection rates associated with a same antenna as the one of the plurality of filtered current tag to antenna mappings; and identifying one of the initial detection rates, from among the identified ones of the plurality of initial detection rates, having a least difference from the current detection rate associated with a tag of the one of the plurality of filtered current tag to antenna mappings, in comparison to remaining ones of the identified ones of the plurality of initial detection rates, wherein the item holder associated with the identified one of the initial detection rates comprises the at least one item holder at which the tag is most likely to be currently located.

Example 25 is an apparatus including a plurality of antennas distributed within a space; a plurality of items coupled to respective tags of a plurality of tags, select ones of the plurality of tags to be detected by select ones of the plurality of antennas when in proximity to each other; a plurality of item holders distributed within the space, select ones of the plurality of item holders to hold select ones of the plurality of items; and one or more processors in communication with the plurality of antennas, wherein the one or more processors is to identify ones of the plurality of tags that moved during a specified time duration associated with current tag to antenna mappings, the current tag to antenna mappings define detection of select ones of the plurality of tags by select ones of the plurality of antennas, and wherein the one or more processors is to determine at least one item holder, from among the plurality of item holders, to which each of the identified ones of the plurality of tags that moved is most likely to be current located to provide a location of the respective item.

Example 26 may include the subject matter of Example 25, and may further include wherein the one or more processors is to, for each one of the current tag to antenna mappings, calculate a current dominant antenna breakdown for a tag associated with the one of the current tag to antenna mappings for each specific time window of a plurality of time windows comprising the specific time duration.

Example 27 may include the subject matter of any of Examples 25-26, and may further include wherein the specific time window comprises a successive sliding time window within the specific time duration.

Example 28 may include the subject matter of any of Examples 25-27, and may further include wherein the one or more processors is to calculate the current dominant antenna breakdown based on a count of all antenna detections of the tag associated with the one of the current tag to antenna mappings within the specific time window and a count of all detections of the tag by the antennas for the tag associated with the one of the current tag to antenna mappings within the specific time window.

Example 29 may include the subject matter of any of Examples 25-28, and may further include wherein the one or more processors is to determine the at least one item holder, from among the plurality of item holders, to which each of the identified ones of the plurality of tags that moved is most likely to be current located comprises, for each of the identified ones of the plurality of tags that moved, the one or more processors is: to calculate a total difference summation associated with each item holder of the plurality of item holders based on the current dominant antenna breakdown associated with each one of the current tag to antenna mappings including the identified one of the plurality of tags and an initial dominant antenna breakdown associated with a respective item holder; and to select the item holder from among the plurality of item holders associated with the smallest total difference summation from among the total difference summations for the item holders, the item holder associated with the smallest total difference summation to comprise the at least one item holder for the identified one of the plurality of tags that moved.

Example 30 may include the subject matter of any of Examples 25-29, and may further include wherein the plurality of items comprises inventory objects, items available for purchase in the space, items to be tracked within the space, apparel, shoes, accessories, sporting equipment, electronics, furniture, and furnishings.

Example 31 may include the subject matter of any of Examples 25-30, and may further include wherein the space comprises a store, a warehouse, an office, a business, a building, a house, a school, a room, a vehicle, a transport, or a part of any of the store, warehouse, office, business, building, house, school, room, vehicle, or transport, or a defined physical space.

Example 32 may include the subject matter of any of Examples 25-31, and may further include wherein the plurality of item holders comprises shelves, racks, tables, drawers, bins, pallets, display cases, or boxes.

Example 33 may include the subject matter of any of Examples 25-32, and may further include wherein the plurality of antennas comprises radio frequency identification (RFID) antennas, Bluetooth antennas or detectors, wireless antennas, tag proximity sensors, or proximity detectors.

Example 34 is one or more computer-readable storage medium including a plurality of instructions to cause an apparatus, in response to execution by one or more processors of the apparatus, to generate a current detection rate by one or more antennas, from among a plurality of antennas, for each tag identified in a plurality of filtered current tag to antenna mappings, the current detection rate by the one or more antennas over a pre-set time duration, wherein select ones of a plurality of tags are to be detected by select ones of the plurality of antennas when in proximity to each other and wherein the plurality of tags associated with items to select ones of a plurality of item holders that hold the items; and determine at least one item holder, from among the plurality of item holders, at which each respective tag identified in the plurality of filtered current tag to antenna mappings is most likely to be currently located to provide a location of the item, wherein to determine the at least one item holder for each tag is based on the current detection rate for each respective tag and a plurality of initial detection rates associated with a plurality of initial item holder to antenna mappings.

Example 35 may include the subject matter of Example 34, and may further include wherein each tag of the plurality of tags is coupled to an item from among a plurality of items located within a space.

Example 36 may include the subject matter of any of Examples 34-35, and may further include wherein the plurality of items comprises inventory objects, items available for purchase in the space, items to be tracked within the space, apparel, shoes, accessories, sporting equipment, electronics, furniture, and furnishings.

Example 37 may include the subject matter of any of Examples 34-36, and may further include wherein the space comprises a store, a warehouse, an office, a business, a building, a house, a school, a room, a vehicle, a transport, or a part of any of the store, warehouse, office, business, building, house, school, room, vehicle, or transport, or a defined physical space.

Example 38 may include the subject matter of any of Examples 34-37, and may further include wherein the plurality of instructions, in response to execution by the one or more processors of the apparatus, further cause to generate the plurality of initial item holder to antenna mappings based on the plurality of initial tag to item holder mappings and a plurality of initial tag to antenna mappings.

Example 39 may include the subject matter of any of Examples 34-38, and may further include wherein the plurality of initial tag to item holder mappings comprises all or a subset of tags, of the plurality of tags, actually disposed on select ones of the plurality of item holders during a time period prior to a current time period associated with the plurality of current tag to antenna mappings.

Example 40 may include the subject matter of any of Examples 34-39, and may further include wherein the plurality of instructions, in response to execution by the one or more processors of the apparatus, further cause to remove select ones of a plurality of current tag to antenna mappings based on the plurality of initial tag to item holder mappings to generate the plurality of filtered current tag to antenna mappings.

Example 41 may include the subject matter of any of Examples 34-40, and may further include wherein to remove select ones of the plurality of current tag to antenna mappings comprises to remove ones of the plurality of current tag to antenna mappings for which a tag associated with the plurality of current tag to antenna mappings does not have a match to a tag from among the plurality of initial tag to item holder mappings.

Example 42 may include the subject matter of any of Examples 34-41, and may further include wherein to remove select ones of the plurality of current tag to antenna mappings comprises, for each tag associated with the plurality of current tag to antenna mappings, to determine a dominant antenna associated with a tag from among antennas mapped to the tag in the plurality of current tag to antenna mappings; and to retain only ones of the plurality of current tag to antenna mappings for which the associated antennas are the dominant antenna for each respective tag, the retained ones of the plurality of current tag to antenna mappings to comprise the plurality of filtered current tag to antenna mappings.

Example 43 may include the subject matter of any of Examples 34-42, and may further include wherein to determine at least one item holder at which each respective tag identified in the plurality of filtered current tag to antenna mappings is most likely to be currently located comprises, for each one of the plurality of filtered current tag to antenna mappings, to identify ones of the plurality of initial detection rates associated with a same antenna as the one of the plurality of filtered current tag to antenna mappings; and to determine one or more of the initial detection rates, from among the identified ones of the plurality of initial detection rates, within a pre-set range of the current detection rate associated with a tag of the one of the plurality of filtered current tag to antenna mappings, wherein one or more of the item holders associated with the respective one or more of the initial detection rates within the pre-set range of the current detection rate comprises the at least one item holder at which the tag is most likely to be currently located.

Example 44 may include the subject matter of any of Examples 34-43, and may further include wherein the pre-set range is within 70 to 130% of the current detection rate associated with a tag of the one of the plurality of filtered current tag to antenna mappings.

Example 45 may include the subject matter of any of Examples 34-42, and may further include wherein to determine at least one item holder at which each respective tag identified in the plurality of filtered current tag to antenna mappings is most likely to be currently located comprises, for each one of the plurality of filtered current tag to antenna mappings, to identify ones of the plurality of initial detection rates associated with a same antenna as the one of the plurality of filtered current tag to antenna mappings; and to identify one of the initial detection rates, from among the identified ones of the plurality of initial detection rates, having a least difference from the current detection rate associated with a tag of the one of the plurality of filtered current tag to antenna mappings, in comparison to remaining ones of the identified ones of the plurality of initial detection rates, wherein the item holder associated with the identified one of the initial detection rates comprises the at least one item holder at which the tag is most likely to be currently located.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

We claim:

1. An apparatus comprising:
one or more storage media to store mappings; and
one or more processors in communication with the one or more storage media, wherein the one or more processors is to generate a current detection rate by one or more antennas, of a plurality of antennas, for each tag identified in a plurality of filtered current tag to antenna mappings over a pre-set time duration, wherein the one or more processors is to determine at least one item holder, from among a plurality of item holders, at which each respective tag identified in the plurality of filtered current tag to antenna mappings is most likely to be currently located, to provide a location of an item, based on the current detection rate for each respective tag and a plurality of initial detection rates associated with a plurality of initial item holder to antenna mappings, and
wherein the plurality of filtered current tag to antenna mappings define associations between select ones of a plurality of tags associated with items to select ones of the plurality of item holders that hold the items, select ones of the plurality of tags to be detected by select ones of the plurality of antennas when in proximity to each other;
wherein the one or more processors is to calculate a total difference summation associated with each item holder of the plurality of item holders; and
wherein, for each identified tag, the one or more processors is to select the item holder where the identified tag is most likely to be currently located from among the plurality of item holders associated with the smallest total difference summation from among the total difference summations for the item holders.

2. The apparatus of claim 1, wherein the one or more processors is to generate the plurality of initial item holder to antenna mappings based on a plurality of initial tag to item holder mappings and a plurality of initial tag to antenna mappings.

3. The apparatus of claim 2, wherein the plurality of initial tag to item holder mappings comprises all or a subset of tags, of the plurality of tags, actually disposed on select ones of the plurality of item holders during a time period prior to a current time period associated with the plurality of filtered current tag to antenna mappings.

4. The apparatus of claim 1, wherein the one or more processors is to remove select ones of a plurality of current tag to antenna mappings based on a plurality of initial tag to item holder mappings to generate the plurality of filtered current tag to antenna mappings.

5. The apparatus of claim 4, wherein the one or more processors is to remove select ones of the plurality of current tag to antenna mappings comprises the one or more processors to remove ones of the plurality of current tag to antenna mappings for which a tag associated with the plurality of current tag to antenna mappings does not have a match to a tag from among the plurality of initial tag to item holder mappings.

6. The apparatus of claim 4, wherein the one or more processors is to remove select ones of the plurality of current tag to antenna mappings comprises the one or more processors:
for each tag associated with the plurality of current tag to antenna mappings, to determine a dominant antenna associated with a tag from among antennas mapped to the tag in the plurality of current tag to antenna mappings; and
to retain only ones of the plurality of current tag to antenna mappings for which the associated antennas are the dominant antenna for each respective tag, the retained ones of the plurality of current tag to antenna mappings to comprise the plurality of filtered current tag to antenna mappings.

7. The apparatus of claim 1, wherein the one or more processors is to determine at least one item holder, from among the plurality of item holders, at which each respective tag identified in the plurality of filtered current tag to antenna mappings is most likely to be currently located comprises, for each one of the plurality of filtered current tag to antenna mappings, the one or more processors:
to identify ones of the plurality of initial detection rates associated with a same antenna as the one of the plurality of filtered current tag to antenna mappings; and
to determine one or more of the initial detection rates, from among the identified ones of the plurality of initial detection rates, within a pre-set range of the current detection rate associated with a tag of the one of the plurality of filtered current tag to antenna mappings,
wherein one or more of the item holders associated with the respective one or more of the initial detection rates within the pre-set range of the current detection rate comprises the at least one item holder at which the tag is most likely to be currently located.

8. The apparatus of claim 1, wherein the one or more processors is to determine at least one item holder, from among the plurality of item holders, at which each respective tag identified in the plurality of filtered current tag to antenna mappings is most likely to be currently located comprises, for each one of the plurality of filtered current tag to antenna mappings, the one or more processors:
to identify ones of the plurality of initial detection rates associated with a same antenna as the one of the plurality of filtered current tag to antenna mappings; and
to identify one of the initial detection rates, from among the identified ones of the plurality of initial detection rates, having a least difference from the current detection rate associated with a tag of the one of the plurality of filtered current tag to antenna mappings, in comparison to remaining ones of the identified ones of the plurality of initial detection rates, wherein the item holder associated with the identified one of the initial detection rates comprises the at least one item holder at which the tag is most likely to be currently located.

9. A computer-implemented method comprising:
generating a current detection rate by one or more antennas, from among a plurality of antennas, for each tag identified in a plurality of filtered current tag to antenna mappings, the current detection rate by the one or more antennas over a pre-set time duration, wherein select ones of a plurality of tags are to be detected by select ones of the plurality of antennas when in proximity to each other and wherein the plurality of tags associated with items to select ones of a plurality of item holders that hold the items;
calculating a total difference summation associated with each item holder of the plurality of item holders; and
determining at least one item holder, from among the plurality of item holders, at which each respective tag identified in the plurality of filtered current tag to antenna mappings is most likely to be currently located to provide a location of the item, wherein determining the at least one item holder for each tag is based on the current detection rate for each respective tag and a plurality of initial detection rates associated with a plurality of initial item holder to antenna mappings, and the item holder where the identified tag is most likely to be currently located is the item holder associated with the smallest total difference summation from among the total difference summations for the item holders.

10. The method of claim 9, further comprising removing select ones of a plurality of current tag to antenna mappings based on a plurality of initial tag to item holder mappings to generate the plurality of filtered current tag to antenna mappings.

11. The method of claim 10, wherein removing select ones of the plurality of current tag to antenna mappings comprises removing ones of the plurality of current tag to antenna mappings for which a tag associated with the plurality of current tag to antenna mappings does not have a match to a tag from among the plurality of initial tag to item holder mappings.

12. The method of claim 10, wherein removing select ones of the plurality of current tag to antenna mappings comprises:
for each tag associated with the plurality of current tag to antenna mappings, determining a dominant antenna associated with a tag from among antennas mapped to the tag in the plurality of current tag to antenna mappings; and
retaining only ones of the plurality of current tag to antenna mappings for which the associated antennas are the dominant antenna for each respective tag, the retained ones of the plurality of current tag to antenna mappings to comprise the plurality of filtered current tag to antenna mappings.

13. The method of claim 9, wherein determining at least one item holder at which each respective tag identified in the plurality of filtered current tag to antenna mappings is most likely to be currently located comprises, for each one of the plurality of filtered current tag to antenna mappings:
identifying ones of the plurality of initial detection rates associated with a same antenna as the one of the plurality of filtered current tag to antenna mappings; and
determining one or more of the initial detection rates, from among the identified ones of the plurality of initial detection rates, within a pre-set range of the current detection rate associated with a tag of the one of the plurality of filtered current tag to antenna mappings,
wherein one or more of the item holders associated with the respective one or more of the initial detection rates within the pre-set range of the current detection rate comprises the at least one item holder at which the tag is most likely to be currently located.

14. The method of claim 13, wherein the pre-set range is within 70 to 130% of the current detection rate associated with a tag of the one of the plurality of filtered current tag to antenna mappings.

15. An apparatus comprising:
a plurality of antennas distributed within a space;
a plurality of items coupled to respective tags of a plurality of tags, select ones of the plurality of tags to be detected by select ones of the plurality of antennas when in proximity to each other;
a plurality of item holders distributed within the space, select ones of the plurality of item holders to hold select ones of the plurality of items; and
one or more processors in communication with the plurality of antennas, wherein the one or more processors is to calculate a total difference summation associated with each item holder of the plurality of item holders, identify ones of the plurality of tags that moved during a specific time duration associated with current tag to antenna mappings, the current tag to antenna mappings define detection of select ones of the plurality of tags by select ones of the plurality of antennas, and wherein the one or more processors is to determine at least one item holder, from among the plurality of item holders, to which each of the identified ones of the plurality of tags that moved is most likely to be currently located to provide a location of the respective item, the item holder where each identified tag is most likely to be currently located is the item holder associated with the smallest total difference summation from among the total difference summations for the item holders.

16. The apparatus of claim 15, wherein the one or more processors is to, for each one of the current tag to antenna mappings, calculate a current dominant antenna breakdown for a tag associated with the one of the current tag to antenna mappings for each specific time window of a plurality of time windows comprising the specific time duration.

17. The apparatus of claim 16, wherein the one or more processors is to calculate the current dominant antenna breakdown based on a count of all antenna detections of the tag associated with the one of the current tag to antenna mappings within the specific time window and a count of all detections of the tag by the antennas for the tag associated with the one of the current tag to antenna mappings within the specific time window.

18. The apparatus of claim 16, wherein the one or more processors is to determine the at least one item holder, from among the plurality of item holders, to which each of the identified ones of the plurality of tags that moved is most likely to be currently located comprises, for each of the identified ones of the plurality of tags that moved, the one or more processors is:
to calculate the total difference summation associated with each item holder of the plurality of item holders based on the current dominant antenna breakdown associated with each one of the current tag to antenna mappings including the identified one of the plurality of tags and an initial dominant antenna breakdown associated with a respective item holder.

19. The apparatus of claim 15, wherein the plurality of item holders comprises shelves, racks, tables, drawers, bins, pallets, display cases, or boxes.

20. The apparatus of claim 15, wherein the plurality of antennas comprises radio frequency identification (RFID) antennas, Bluetooth antennas or detectors, wireless antennas, tag proximity sensors, or proximity detectors.

21. One or more non-transitory computer-readable storage media comprising a plurality of instructions to cause an apparatus, in response to execution by one or more processors of the apparatus, to:

generate a current detection rate by one or more antennas, from among a plurality of antennas, for each tag identified in a plurality of filtered current tag to antenna mappings, the current detection rate by the one or more antennas over a pre-set time duration, wherein select ones of a plurality of tags are to be detected by select ones of the plurality of antennas when in proximity to each other and wherein the plurality of tags associated with items to select ones of a plurality of item holders that hold the items;

calculate a total difference summation associated with each item holder of the plurality of item holders; and determine at least one item holder, from among the plurality of item holders, at which each respective tag identified in the plurality of filtered current tag to antenna mappings is most likely to be currently located to provide a location of the item, wherein to determine the at least one item holder for each tag is based on the current detection rate for each respective tag and a plurality of initial detection rates associated with a plurality of initial item holder to antenna mappings, and the item holder where the identified tag is most likely to be currently located is the item holder associated with the smallest total difference summation from among the total difference summations for the item holders.

22. The computer-readable storage media of claim 21, wherein the plurality of instructions, in response to execution by the one or more processors of the apparatus, are further to generate the plurality of initial item holder to antenna mappings based on a plurality of initial tag to item holder mappings and a plurality of initial tag to antenna mappings.

23. The computer-readable storage media of claim 21, wherein the plurality of instructions, in response to execution by the one or more processors of the apparatus, are further to remove select ones of a plurality of current tag to antenna mappings based on a plurality of initial tag to item holder mappings to generate the plurality of filtered current tag to antenna mappings.

24. The computer-readable storage media of claim 21, wherein to determine at least one item holder at which each respective tag identified in the plurality of filtered current tag to antenna mappings is most likely to be currently located comprises, for each one of the plurality of filtered current tag to antenna mappings:

to identify ones of the plurality of initial detection rates associated with a same antenna as the one of the plurality of filtered current tag to antenna mappings; and to identify one of the initial detection rates, from among the identified ones of the plurality of initial detection rates, having a least difference from the current detection rate associated with a tag of the one of the plurality of filtered current tag to antenna mappings, in comparison to remaining ones of the identified ones of the plurality of initial detection rates, wherein the item holder associated with the identified one of the initial detection rates comprises the at least one item holder at which the tag is most likely to be currently located.

\* \* \* \* \*